(12) United States Patent
Ergin et al.

(10) Patent No.: US 10,567,510 B2
(45) Date of Patent: *Feb. 18, 2020

(54) TECHNIQUES FOR ROUTING PACKETS BETWEEN VIRTUAL MACHINES

(71) Applicant: INTEL CORPORATION, Santa Clara, CA (US)

(72) Inventors: Mesut A. Ergin, Portland, OR (US); Jr-Shian Tsai, Portland, OR (US); Janet Tseng, Portland, OR (US); Ren Wang, Portland, OR (US); Jun Nakajima, San Ramon, CA (US); Tsung-Yuan Tai, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,698

(22) Filed: Oct. 2, 2017

(65) Prior Publication Data

US 2018/0270309 A1 Sep. 20, 2018

Related U.S. Application Data

(63) Continuation of application No. 14/830,862, filed on Aug. 20, 2015, now Pat. No. 9,781,209.

(51) Int. Cl.
*H04L 12/50* (2006.01)
*H04L 29/08* (2006.01)
(Continued)

(52) U.S. Cl.
CPC ........ *H04L 67/1097* (2013.01); *H04L 45/306* (2013.01); *H04L 45/38* (2013.01);
(Continued)

(58) Field of Classification Search
CPC ... H04L 5/0053; H04L 12/26; H04L 12/2894; H04L 12/54; H04L 12/5601;
(Continued)

(56) References Cited

U.S. PATENT DOCUMENTS 5,440,691 A * 8/1995 Carrafiello .............. G06F 13/18 709/233
2009/0219936 A1* 9/2009 Tripathi .................. H04L 41/00 370/392

(Continued)

FOREIGN PATENT DOCUMENTS

EP 2482496 A1 8/2012

OTHER PUBLICATIONS

Chang et al, Virtualization Technology for TCP/IP Offload Engine, IEEE, 13 pages, Jun. 2014.*

(Continued)

*Primary Examiner* — Frank Duong

(57) ABSTRACT

Various embodiments are generally directed to techniques for improving the efficiency of exchanging packets between pairs of VMs within a communications server. An apparatus may include a processor component; a network interface to couple the processor component to a network; a virtual switch to analyze contents of at least one packet of a set of packets to be exchanged between endpoint devices through the network and the communications server, and to route the set of packets through one or more virtual servers of multiple virtual servers based on the contents; and a transfer component of a first virtual server of the multiple virtual servers to determine whether to route the set of packets to the virtual switch or to transfer the set of packets to a second virtual server of the multiple virtual servers in a manner that bypasses the virtual switch based on a routing rule.

26 Claims, 19 Drawing Sheets

(51) Int. Cl.
*H04L 12/725* (2013.01)
*H04L 12/721* (2013.01)
*H04L 12/713* (2013.01)
*H04L 12/835* (2013.01)
*H04L 12/26* (2006.01)

(52) U.S. Cl.
CPC ............ *H04L 45/586* (2013.01); *H04L 47/30* (2013.01); *H04L 43/103* (2013.01)

(58) Field of Classification Search
CPC . H04L 12/5602; H04L 12/713; H04L 12/721; H04L 12/725; H04L 12/835; H04L 29/06176; H04L 29/0653; H04L 29/06095; H04L 29/06163; H04L 29/08; H04L 43/103; H04L 45/02; H04L 45/306; H04L 45/04; H04L 45/38; H04L 45/42; H04L 45/50; H04L 45/586; H04L 45/74; H04L 47/10; H04L 47/15; H04L 47/2441; H04L 47/27; H04L 47/30; H04L 47/32; H04L 47/35; H04L 47/70; H04L 49/10; H04L 49/3009; H04L 49/309; H04L 65/102; H04L 67/1097; H04L 2012/54; H04L 2012/5631; H04L 2012/5635; H04L 2012/5665
See application file for complete search history.

(56) References Cited

U.S. PATENT DOCUMENTS

| | | | |
|---|---|---|---|
| 2011/0320632 A1 | 12/2011 | Karino | |
| 2014/0215463 A1 | 7/2014 | Hendel et al. | |
| 2015/0139229 A1* | 5/2015 | Kamble | G06F 9/45558 370/390 |
| 2015/0370586 A1* | 12/2015 | Cooper | G06F 9/45533 710/308 |
| 2016/0134531 A1* | 5/2016 | Assarpour | H04L 45/74 370/392 |
| 2016/0182382 A1* | 6/2016 | Singaravelu | H04L 67/16 709/223 |
| 2016/0232019 A1* | 8/2016 | Shah | G06F 9/45558 |
| 2016/0352629 A1* | 12/2016 | Wang | H04L 45/306 |

OTHER PUBLICATIONS

Hwang et al, NetVM: High Performance and Flexible Networking Using Virtualization on Commodity Platforms, USENIX, 15 pages, Apr. 2014.*
European Search Report and Written Opinion for the European Patent Application No. EP16837789, dated Jan. 29, 2019, 5 pages.

* cited by examiner

TECHNIQUES FOR ROUTING PACKETS BETWEEN VIRTUAL MACHINES

CROSS-REFERENCE TO RELATED APPLICATIONS

This application is a continuation of, claims the benefit of, and claims priority to U.S. patent application Ser. No. 14/830,862 filed on Aug. 20, 2015, the subject matter of which is incorporated herein by reference in its entirety.

BACKGROUND

Various communications systems, including both wired and wireless communications systems, employ servers to control the flow of communications traffic, provide security and other services, track amounts of data and/or amounts of time for each instance of use of services, etc. Such servers are often geographically distributed throughout various regions of the networks on which such communications systems are based, including at wired switch points and/or in the vicinity of transceiver installations.

In a recent trend, sets of multiple separate servers at each such geographically diverse location are being replaced by single physical servers that are each able to perform the various different functions of each of those separate servers within separate virtual machines (VMs). Continuing improvements in the performance and processing abilities of a single server have enabled a single server to employ such virtualization to do what once required multiple separate servers, but less expensively and with the consumption of less electrical energy. However, challenges remain in fully recreating the processing environments of each of those multiple separate servers among what is now the multiple VMs of a single server.

DETAILED DESCRIPTION

Figure 1:
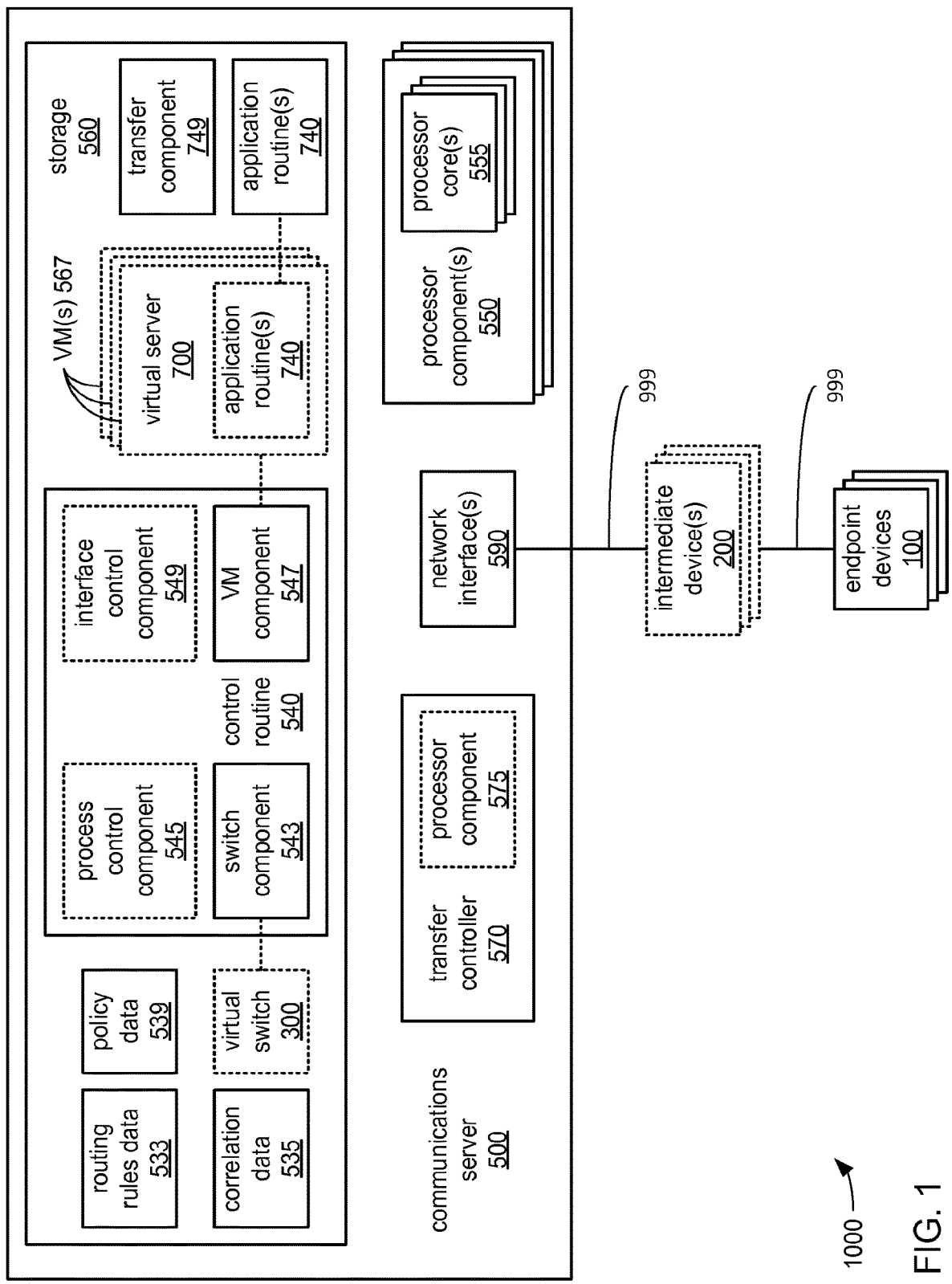
FIG. 1 illustrates an example embodiment of a communications system.

Various embodiments are generally directed to techniques for improving the efficiency of exchanging packets between pairs of VMs within a communications server. As sets of packets received by the communications server proceed along various pathways through various combinations of VMs instantiated within the communications server, the sets of packets may normally proceed from one VM to another through a virtual switch that is also instantiated within the communications server. Each time a set of packets is transferred from the virtual switch to one of the VMs, or vice versa, that set of packets may pass through a virtual network interface of the virtual switch and a corresponding virtual network interface of a VM. Each passage through a virtual network interface imposes an amount of latency that is added to the overall amount of time required for a set of packets to be processed through various VMs, which may be problematic for sets of packets exchanged between endpoint devices through the communications server, since too great an overall amount of latency may adversely affect the quality of communications between those endpoint devices. Further, the virtual switch may have an overall throughput limit on the quantity of packets it is able to convey per unit of time, and each instance of a set of packets exchanged between VMs through the virtual switch may consume some of that overall throughput limit such that the overall limit may more quickly reached. This may lead to degradation in the throughput of packets through the communications server, as reaching the overall throughput limit of the virtual switch such that errors in the handling of packets may occur and need to be corrected, and/or other events may be triggered. To address this, at least one pair of VMs may cooperate to directly transfer a set of packets from one VM to another in a manner that bypasses the virtual switch and multiple virtual network interfaces coupling those VMs to the virtual switch, thereby significantly reducing the overall amount of latency imposed and/or increasing the overall rate of throughput of sets of packets through the communications server. Alternatively or additionally, such cooperation among at least one pair of VMs to so bypass the virtual switch may sufficiently reduce the potential for the virtual switch becoming a bottleneck for the routing of sets of packets that overall scalability may be improved such that a single communications server may become capable of supporting the operation of a greater quantity of virtual servers within.

More specifically, multiple VMs generated within a communications server of a communications network may communicate with each other within that communications server through a virtual switch that is also generated within the communications server. Each VM may be configured to operate as a virtual version of what may otherwise be a physically separate and distinct server providing a particular service supporting communications between endpoint devices of the communications network. Such services may include, and are not limited to, monitoring duration and/or amounts of data exchanged for each instance of communications between two or more communications devices, establishment and/or maintenance of security for such communications, supporting movement of a communications device between portions of a single communications network and/or between different communications networks, etc. The virtual switch may be configured to operate as a virtual version of what may otherwise be a physically separate and distinct network switch coupling the aforementioned physically separate and distinct servers. The virtual switch may be generated within a host processing environment of the communications server in which a control routine may be executed that effects the generation of each of the VMs. Within the virtual switch and within each of the VMs may be defined one or more virtual network interfaces by which each of the VMs may be coupled to the virtual switch and by which the virtual switch may be coupled to one or more network interfaces of the communications server by which communications server is coupled to the communications network.

During operation of the communications server within the communications network, sets of packets may be exchanged between endpoint devices through the communications server. The set of packets of may represent voice and/or non-voice audio, still images, motion video, documents, executable instructions, and/or any of a wide variety of other types of data that may be exchanged between communications devices through a communications network, including through one or more of such communications servers. Such a set of packets may need to proceed through particular VMs in a particular order to enable particular forms of processing to be performed on those packets within each of those VMs such that those packets may be said to follow a particular "pathway" (also often referred to as a "service function chain") through those VM(s). Since the VMs may each be coupled to the virtual switch to communicate with each other through the virtual switch, any such exchange of packets from one VM to another may pass through the virtual switch. Thus, a pathway followed by a particular set of packets through multiple VMs may entail multiple instances of passing through the virtual switch during each instance of being passed from one VM to another. Stated differently, the pathway may "loop through" the virtual switch multiple times as part of proceeding through those VMs. As a result, the pathway may proceed through multiple virtual network interfaces of the virtual switch and of each VM.

The virtual switch may maintain a data structure storing a set of rules by which the virtual switch determines which VM to transmit a set of packets upon first receiving the set of packet from the communications network through a physical network interface of the communications server, and upon on each occasion when the set of packets is transmitted back to the virtual switch from a VM to which the virtual switch transmitted the set of packets. The set of rules may enable determining what VM to send the set of packets to on each of those occasions based on any of a variety of factors, including and not limited to, a destination address specified in the header(s) of one or more of the packets making up the set of packets, and/or the type and/or size of the data conveyed in the payload(s) of one or more of the packets. More specifically, such a data structure may specify rules for what action to take when any of variety of sets of criteria are met by a set of packets, with such actions including and limited to, modifying a portion of a set of packets, dropping a set of packets entirely, forwarding a set of packets to a particular port, etc. Unfortunately, the "looping" of various pathways followed by various sets of packets between VMs through the virtual switch can add considerable latencies to the overall latency for the passage of sets of packets between endpoint devices through the communications server. In particular, each exchange between the virtual switch and one of the VMs entails the passage of a set of packets through a virtual network interface within the virtual switch and another virtual network interface within that VM, and each such passage through a virtual network interface may add latency. Further, each exchange of between the virtual switch and one of the VMs may push the rate at which packets pass through the virtual switch closer to an overall throughput limit of the virtual switch. Still further, even where overall limitations in throughput are not encountered, each such use of the virtual switch results in a consumption of resources by the virtual switch, such as and not limited to, processing resources, storage space, electrical power, etc. It may be deemed desirable to save such resources for use by one or more of the VMs, instead of by the virtual switch.

As part of reducing the number of such passages of sets of packets through virtual network interfaces to reduce latencies, one or more pairs of the VMs may be capable of cooperating to directly exchange a set of packets therebetween so as to bypass the virtual switch, altogether. One the VMs in such a pair of VMs may receive a subset of the rules for determining what VM a set of packets is to be transmitted to next from the virtual switch, as well as how to make that determination (e.g., one or more criteria that must be met by a set of packets to be transferred to a particular VM). That one of the VMs may use that subset of the rules to determine whether to transmit a set of packets back to the virtual switch or to directly transmit that set of packets to the other VM in that pair. More precisely, the subset of the rules may specify a relatively simple test that may be efficiently performed within the one VM. By way of example, such a test may entail an analysis of a destination address and/or other information within a header of one of the packets of a set of packets to see if particular criteria are met to make the determination of where to transmit that set of packets to. All sets of packets that cannot be determined through that test as being packets to directly transmit to the other VM in that pair may then, by default, be transmitted by that one VM back to the virtual switch to enable the virtual switch to apply a more complex set of tests specified by the fuller set of rules to determine where to next transmit those sets of packets. It may be deemed desirable to avoid the additional consumption of processing, storage and/or other resources that would be required to perform a more extensive set of tests on each set of packets processed within the one VM, and leave the performance of a more extensive set of tests to the virtual switch.

In various embodiments, one or both of the VMs of such a pair may each be instantiated to include a transfer component that performs such a relatively simple test in accordance with such a subset of the rules. In some embodiments, each of the two VMs may be provided with permissions to access a shared memory space. In such embodiments, the transfer component of one of the VMs may store a set of packets to be directly transmitted to the other VM within the shared memory space to enable the transfer component of the other VM to retrieve that set of packets therefrom. In other embodiments, one of the two VMs may be provided with permissions to access a portion of the memory space belonging to the other VM. In such other embodiments, the transfer component of the one of the two VMs may directly store a set of packets within that memory space of that other VM to effect the transfer of that set of packets to that other VM.

In still other embodiments, the communications server may incorporate a transfer controller able to access the separate memory spaces of each of the two VMs to transfer a set of packets from one to the other. In such still other embodiments, the transfer controller may be any of a variety of hardware based components able to move data from one portion of memory to another, including and not limited to a direct memory access (DMA) controller or a trusted computing module (TCM) incorporating an independent processor able to be operated in a manner akin to such a DMA controller. The transfer component of one of the two VMs may signal the transfer controller to transfer a set of packets from the memory space of the one VM to the memory space of the other. In yet other embodiments, one or more processor cores of one or more processor components of the communications server may employ an instruction set that includes one or more instructions able to be used to transfer data between portions of memory belonging to separate VMs. The transfer component of one of the two VMs may employ the one or more instructions to cause such a processor core to transfer a set of packets from the memory space of one of the two VMs to the separate memory space of the other.

In various embodiments, the virtual network interfaces within the virtual switch and within each VM may be operable in various different modes that provide different tradeoffs between latencies in exchanging packets and demands on processing resources. By way of example, interrupt-driven operation of a virtual network interface may greatly minimize the processing resources required to support that virtual network interface, but the time required to handle each interrupt may be so great that an unacceptable amount of latency may be added to the exchanging of packets through that virtual network interface. In contrast, operating a virtual network interface in a polling mode may ensure that packets are conveyed through that virtual network interface with minimal latency, but such use of polling may consume nearly all of the processing resources of an entire core of a processor component for just that one virtual network interface.

A packet analyzer of a virtual switch may analyze the contents of one or more of the packets of a set of packets received from the communications network at a network interface of the communications server. Such contents as a destination address, a type of data and/or the data size of a portion of data may then be correlated to a known pathway through multiple VMs within the communications server to determine what pathway the set of packets just received at the network interface may take. Upon determining what pathway is to be taken by a particular set of packets, particular ones of multiple virtual network interfaces that are along that pathway may be preemptively configured to operate in a polling mode to enable that set of packets to proceed along that pathway more quickly, while other virtual network interfaces that are not along that pathway may not be so configured. However, where a known pathway proceeds through a pair of VMs that are able to directly exchange a set of packets therebetween, the virtual network interfaces that are configured to operate in the polling mode may be caused to not include virtual network interfaces that are bypassed as a result of using such an ability to directly exchange a set of packets.

In various embodiments, the virtual network interfaces associated with each of the VMs may include buffers for the transmission and/or reception of packets that are recurringly monitored, and the rate at which packets are processed within a VM may be increased or decreased to adjust the rate at which such a buffer associated with a virtual network interface of that VM is filled and/or emptied to prevent an instance of buffer overflow and/or underflow. Occurrences of such a buffer overflow or underflow at a virtual network interface of a VM may trigger context switches by a core of a processor component that executes instructions associated with that VM, thereby causing that core to execute instructions of an entirely separate process to address that buffer overflow or underflow, followed by another context switch to resume executing instructions associated with that VM. By way of example, execution of instructions to maintain that VM by that core to be preempted in favor of executing instructions of VM monitor (VMM) software in a more privileged context to perform various "housekeeping" functions to address such events, followed by a return to executing instructions to maintain that VM. Each such context switch may take a considerable amount of time to perform and may consume considerable processing resources such that there may be a delay in the resumption of executing instructions associated with a VM that may be sufficiently long as to introduce an unacceptable amount of latency in the processing of packets.

To prevent or to at least minimize occurrences of the need for such context switching, the degree to which each such buffer of each VM is full may be recurringly compared to underflow and/or overflow thresholds to determine whether to adjust the rate at which packets are processed in that VM. Where the degree to which a buffer for receiving packets at a VM is full falls low enough to meet or fall below an underflow threshold or where the degree to which a buffer for transmitting packets from that VM is full rises high enough to meet or exceed an overflow threshold, the rate at which packets are processed within that VM may be reduced to reduce the rate at which that receiving buffer is emptied and/or at which that transmission buffer is filled. Conversely, where the degree to which a buffer for receiving packets at a VM is full rises high enough to meet or exceed an overflow threshold or where the degree to which a buffer for transmitting packets from that VM is full falls low enough to meet or fall below an underflow threshold, the rate at which packets are processed within that VM may be increased to increase the rate at which that receiving buffer is emptied and/or at which that transmission buffer is filled With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a communications system 1000 providing a communications network 999 through which packets of data may be exchanged between endpoint devices 100 through a communications server 500. As depicted, the communications system 1000 may incorporate multiple ones of the endpoint devices 100, one or more intermediate devices 200 at one or more locations within the network 999, and/or at least one of the communications server 500. The communications server 500 and/or the intermediate device(s) 200 may be operated by a communications services provider (e.g., a corporate, governmental or other entity) to provide communications services to enable the exchange of packets among the endpoint devices 100.

In various embodiments, each of the endpoint devices 100 may be any of a variety of types of communications device, including and not limited to, wired or wireless telephones (e.g., smart phones), mobile devices (e.g., tablet or laptop computers), stationary computing devices (e.g., desktop computers), surveillance devices (e.g., cameras), remote monitoring devices (e.g., seismographic sensors), etc. The endpoint devices 100 may exchange sets of packets through the network 999 and through the communications server 500 to convey any of a variety of types of data, including and not limited to, voice and/or non-voice audio, still images, motion video, documents, etc. Additionally, each piece of data, regardless of its type, may be any of a variety of sizes as measured in bits, bytes, words, doublewords, quadwords, etc. Depending on the types of communications supported among the endpoint devices 100, there may or may not be correlations among particular types of data and particular data sizes (e.g., motion video data tending to be larger in its data size than audio or textual data).

The network 999 may include wired and/or wireless portions by which the sets of packets are conveyed between each of the endpoint devices 100 and the communications server 500 where the communications server 500 may then control and effect the relaying of the sets of packets between different ones of the endpoint devices 100. At least a portion of the network 999 may include one or more of the intermediate devices 200 to convert between wired and wireless portions, to buffer signals, to convert protocols, etc. Stated differently, in embodiments that include one or more of the intermediate devices 200, the intermediate devices 200 may include one or more of network routers, network bridges, network switches, network relays, media converters, protocol converters, transmitters and/or receivers, etc.

The communications server 500 may be any of a variety of types of computing device selected to have sufficient processing, network interfacing capacity and/or other resources to process and exchange sets of packets between endpoint devices 100 through the network 999 with minimal latency and/or with a guaranteed rate of throughput of packets through the communications server 500. The minimization of latency introduced in exchanging sets of packets between endpoint devices 100 through the network 999 and through the communications server 500 may be deemed an important requirement of the operation of the communications system 1000 to ensure that exchanges of packets associated with two-way voice and/or video communications occurs without perceivable and/or appreciable delay between persons operating the endpoint devices 100 to communicate with each other.

In various embodiments, the communications server 500 may incorporate one or more processor components 550, a storage 560, a transfer controller 570, and/or one or more network interfaces 590 to couple the communications server 500 to the network 999. Each of the processor components 550 may incorporate one or more processor cores 555. The transfer controller 570 may incorporate a processor component 575 operating in a secure processing environment that is isolated from the one or more processor components 550. The storage 560 may store one or more of a control routine 540, one or more different application routines 740, the transfer component 749, a policy data 539, a correlation data 535 and a routing rules data 533. The control routine 540 and/or the one or more application routines 740 may incorporate a sequence of instructions operative on the one or more processor cores 555 of the one or more processor components 550 to implement logic to perform various functions.

As depicted, the control routine 540 may incorporate a switch component 543, a process control component 545, a VM component 547, and/or an interface control component 549. In executing the control routine 540, one or more processor cores 555 among one or more of the processor components 550 may execute the instructions of one or more of these components 543, 545, 546 and 549. Specifically, in executing the switch component 543, one or more of the processor cores 555 may be caused to instantiate a virtual switch 300. Alternatively or additionally, in executing the VM component 547, one or more of the processor cores 555 may be caused to instantiate one or more VMs 567 within separate memory spaces allocated within the storage 560. As depicted, each of which may be configured as an instance of a virtual server 700 executing one of the different application routines 740.

Figure 2A:
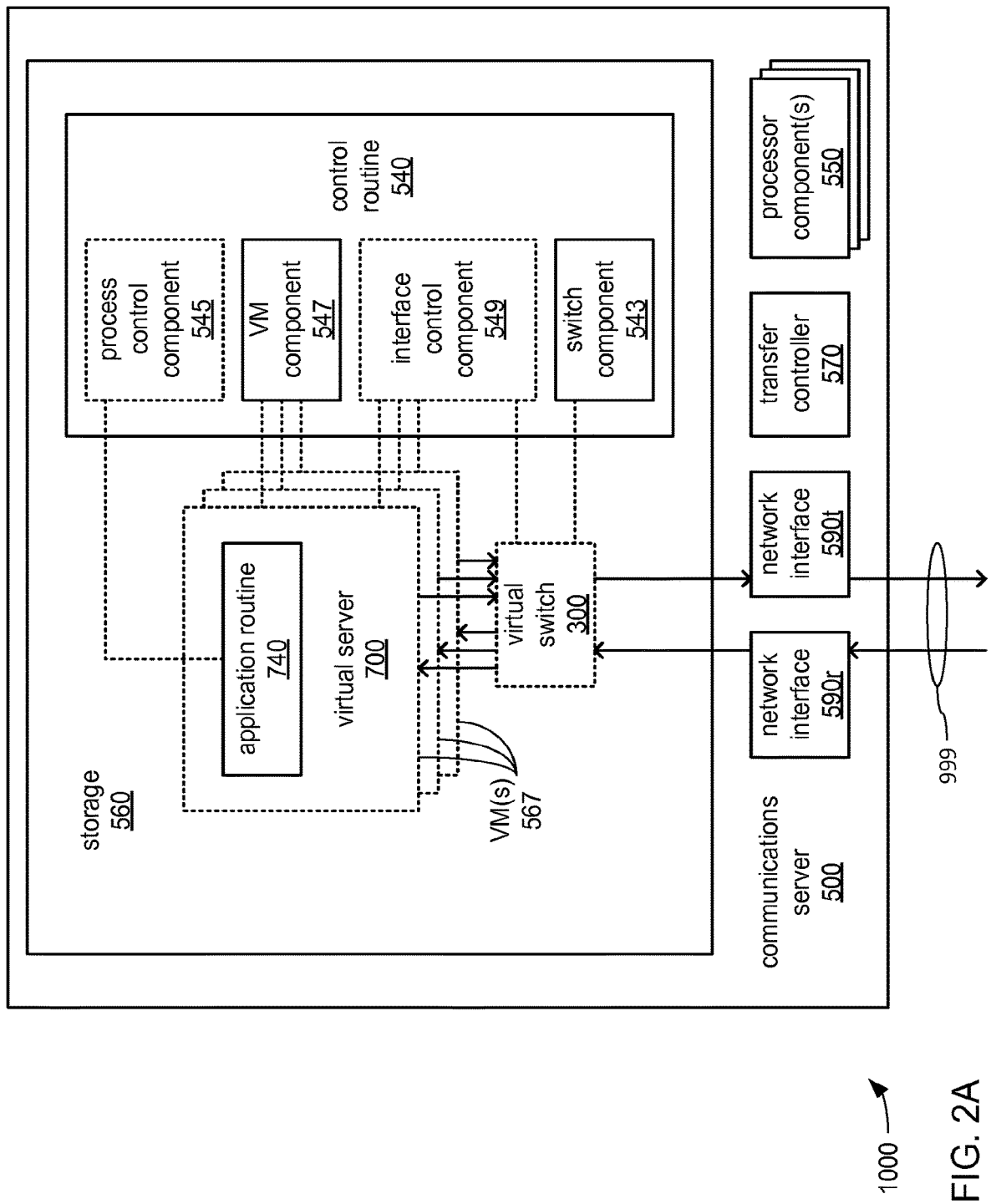
FIGS. 2A and 2B, together, illustrate an example embodiment of a communications server.
Figure 2B:
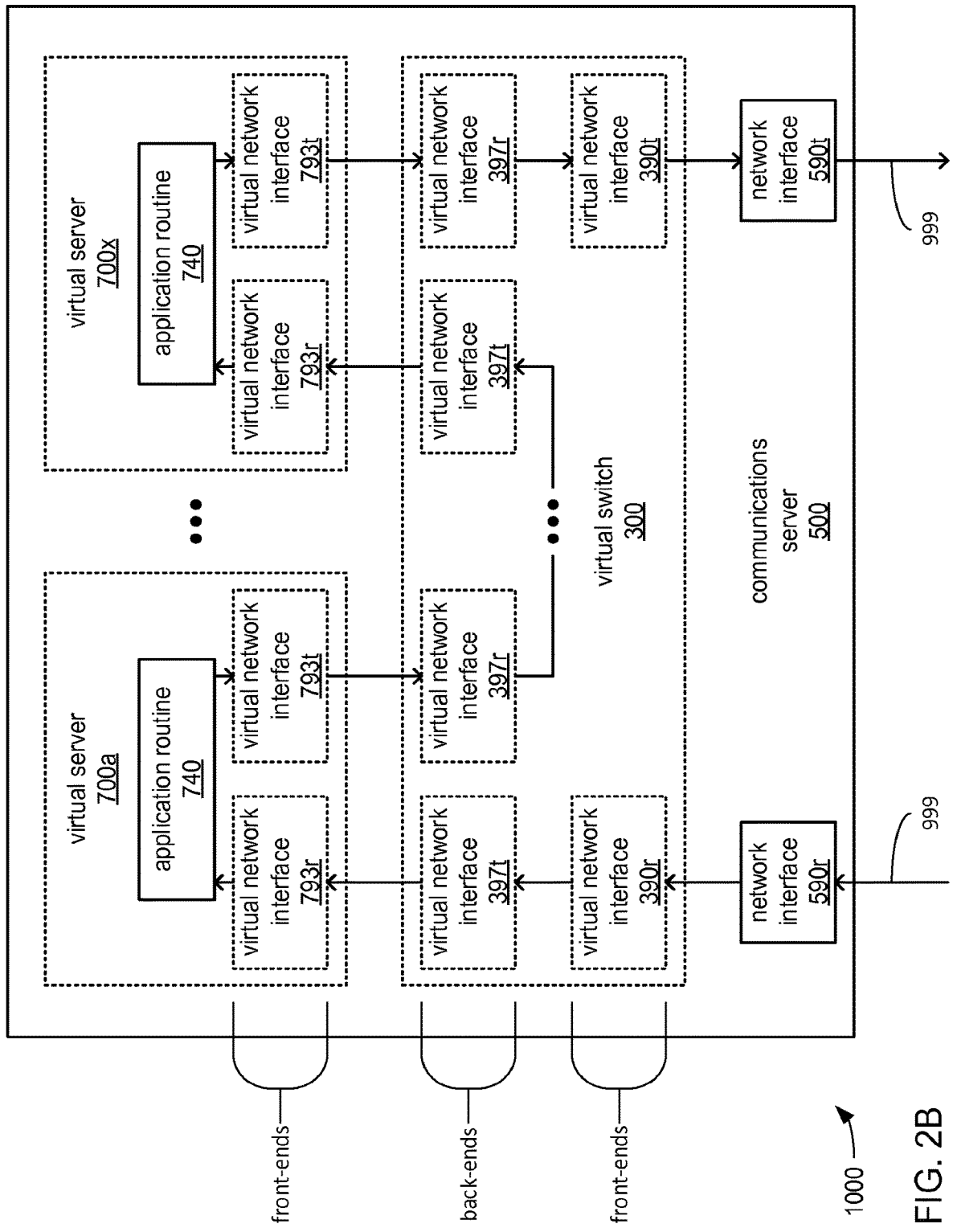

FIGS. 2A and 2B, together, depict aspects of the operation of an example embodiment of the communications server 500 in greater detail. Among those aspects are those of the instantiation and operation of the virtual switch 300. Also among those aspects are those of the execution of one or more of the application routines 740 within one or more instances of the virtual server(s) 700.

As previously discussed, one or more VMs 567 may be instantiated, and each of those VMs 567 may be configured as an instance of a virtual server 700. Within each of the virtual servers 700, the one or more processor cores 555 that are caused by the VM component 547 to instantiate the VM 567 on which each of the virtual servers 700 is based may be caused to execute one of the application routines 740 within that virtual environment to perform any of a variety of operations in support of communications between at least a pair of the endpoint devices 100. More precisely, different ones of the application routines 740 may cause one or more of the processor cores 555 to perform various different processing operations on sets of packets exchanged between at least a pair of the endpoint devices 100 as part of establishing and/or supporting a communications session therebetween. Such processing operations performed on sets of packets may include, and are not limited to, verification of authorization given to an endpoint device to use the communications system 1000, associating a communications session with an authorized account to track its occurrence, tracking a duration of a communications session, tracking an amount of data exchanged during the communications session, tracking changes in geographic location of one of the endpoint devices 100, providing various convenience services to one of the endpoint devices 100 (e.g., voicemail, voice-based dialing, conference calling, antivirus data scanning, etc.).

The one or more virtual servers 700 may be instantiated within the communications server 500 as part of employing the communications server 500 to replace what may have previously been multiple separate servers that may have each performed only one of the different types of processing operations performed by each of the application routines 740. Exactly what processing operations are performed by each of the virtual servers 700 may be largely determined by which one(s) of the different application routines 740 may be executed within each. Such use of the communications server 500 to replace multiple separate servers may be deemed desirable to reduce costs, to reduce consumption of electric power, and/or to increase the efficiency with which those processing operations are performed.

Turning more specifically to FIG. 2A, in addition to replacing multiple separate servers, the communications server 500 may also be operated to replace a separate physical network switch that might have otherwise coupled the multiple separate servers to each other and to the network 999 with a virtual switch. More specifically, one or more of the processor cores 555 may be caused by execution of the switch component 543 to instantiate the virtual switch 300 to couple each of the virtual servers 700 to each other and to the network 999. As depicted, the virtual switch 300 may be so instantiated to be interposed between the one or more network interfaces 590 and the one or more virtual servers 700 of the one or more VMs 567. As also depicted, among the one or more network interfaces 590 incorporated into the communications server 500 may be a distinct network interface 590r to receive sets of packets from the endpoint devices 100 via the network 999 and a distinct network interface 590t to transmit sets of packets to the endpoint devices 100 via the network 999. However, other embodiments are possible in which there may be other quantities of the network interfaces 590 that may each be used in various ways to exchange packets with the endpoint devices 100.

Turning more specifically to FIG. 2B, regardless of the exact quantity and/or exact manner of use of the one or more network interfaces 590, as depicted, the sets of packets received by the server 500 from one of the endpoint devices 100 may be routed by the virtual switch 300 through one or more of the virtual servers 700 for one or more forms of processing within each of the one or more virtual servers 700 before being transmitted to another of the endpoint devices 100. More specifically and as depicted, there may be any number of virtual servers 700 (as indicated by the depiction of virtual servers 700a through 700x) through which such sets of packets may be routed by the virtual switch 300 in a serial or "daisy chain" manner. Further, different sets of packets may be routed by the virtual switch 300 through more or fewer of the virtual servers 700 and/or in differing order such that different sets of packets may follow different "pathways" through one or more different ones of the virtual servers 700. The differences among the various pathways that may be taken by different sets of packets may be caused by services needed by some of the endpoint devices 100 that are not needed by others, load balancing among multiple ones of the virtual servers 700 that perform the same processing operation, differences in types and/or sizes of data conveyed, etc.

As also depicted, the virtual switch 300 and each of the virtual servers 700 may include multiple virtual network interfaces that enable the virtual switch 300 and the virtual servers 700 to interact to exchange packets in a manner resembling how the physically distinct network switch and the multiple physically distinct servers that they replace would have interacted to exchange packets. More specifically, in executing the switch component 543 to provide the virtual switch 300, one or more of the processor cores 555 may be caused to generate virtual network interfaces 390r and 390t corresponding to and coupled to the network interfaces 590r and 590t, respectively, to receive and transmit sets of packets from and to the network 999. Also, in executing the switch component 543, the same one or more of the processor cores 555 may be caused to generate multiple pairs of network interfaces 397t and 397r that may each be employed to transmit and receive, respectively, sets of packets to and from one of the virtual servers 700. Further, in executing the VM component 547 to provide the VMs 567 configured as instances of the virtual servers 700, multiple ones of the processor cores 555 may be caused to generate a pair of virtual network interfaces 793r and 793t within each of the virtual servers 700 to receive and transmit, respectively, sets of packets from and to a corresponding pair of the virtual network interfaces 397t and 397r of the virtual switch 300. As further depicted, within each of the virtual servers 700, sets of packets received from the virtual switch 300 by the virtual network interface 793r are provided to the application routine 740, and following the processing performed on those sets of packets due to execution of the application routine 740 therein, those sets of packets are then provided to the virtual network interface 793t for transmission back to the virtual switch 300.

It should be noted that the virtual network interfaces 793r and 793t within each of the virtual servers 700 (including each of the depicted virtual servers 700a and 700x) may also be referred to as the "RX front-end" and the "TX front-end," respectively, of each of the virtual servers 700. Correspondingly, each of the sets of the virtual interfaces 397t and 397r within the virtual switch 300 (and that corresponds to the "front-ends" of one of the virtual servers 700) may also be referred to as one of the sets of a "TX back-end" and a "RX back-end," respectively, of the virtual switch 300. Further, the virtual network interfaces 390r and 390t within the virtual switch 300 (each of which corresponds to one of the physical network interfaces 590r and 590t, respectively) may also be referred to as the "RX front-end" and the "TX front-end," respectively, of the virtual switch 300.

Turning again more specifically to FIG. 2A, in executing the control routine 540, at least one of the processor cores 555 of at least one of the processor components 550 may execute the interface control component 549 to control aspects of the exchanging of packets between the virtual switch 300 and each of the virtual servers 700, and/or the process control component 545 to the control aspects of the processing of sets of packets. As will be explained in greater detail, one or more of the virtual network interfaces 390r, 390t, 397r, 397t, 793r and 793t may be operable in different modes to cause quicker exchanges of sets of packets to occur with greater efficiency. As will also be explained in greater detail, the execution of the application routines 740 within each of the virtual servers 700 may be controllable to vary the rate at which packets are processed therein. However, as will also be explained in greater detailed, such exchanges of packets between the virtual switch 300 and various ones of the virtual servers 700 may occur by default as part of indirectly conveying packets from one virtual serer 700 to another. At least some sets of packets may, instead, be directly transferred by one of the virtual servers 700 to another in a manner that entirely bypasses the virtual switch 300, as well as a subset of the virtual network interfaces 397r, 397t, 793r and/or 793t.

Figure 3A:
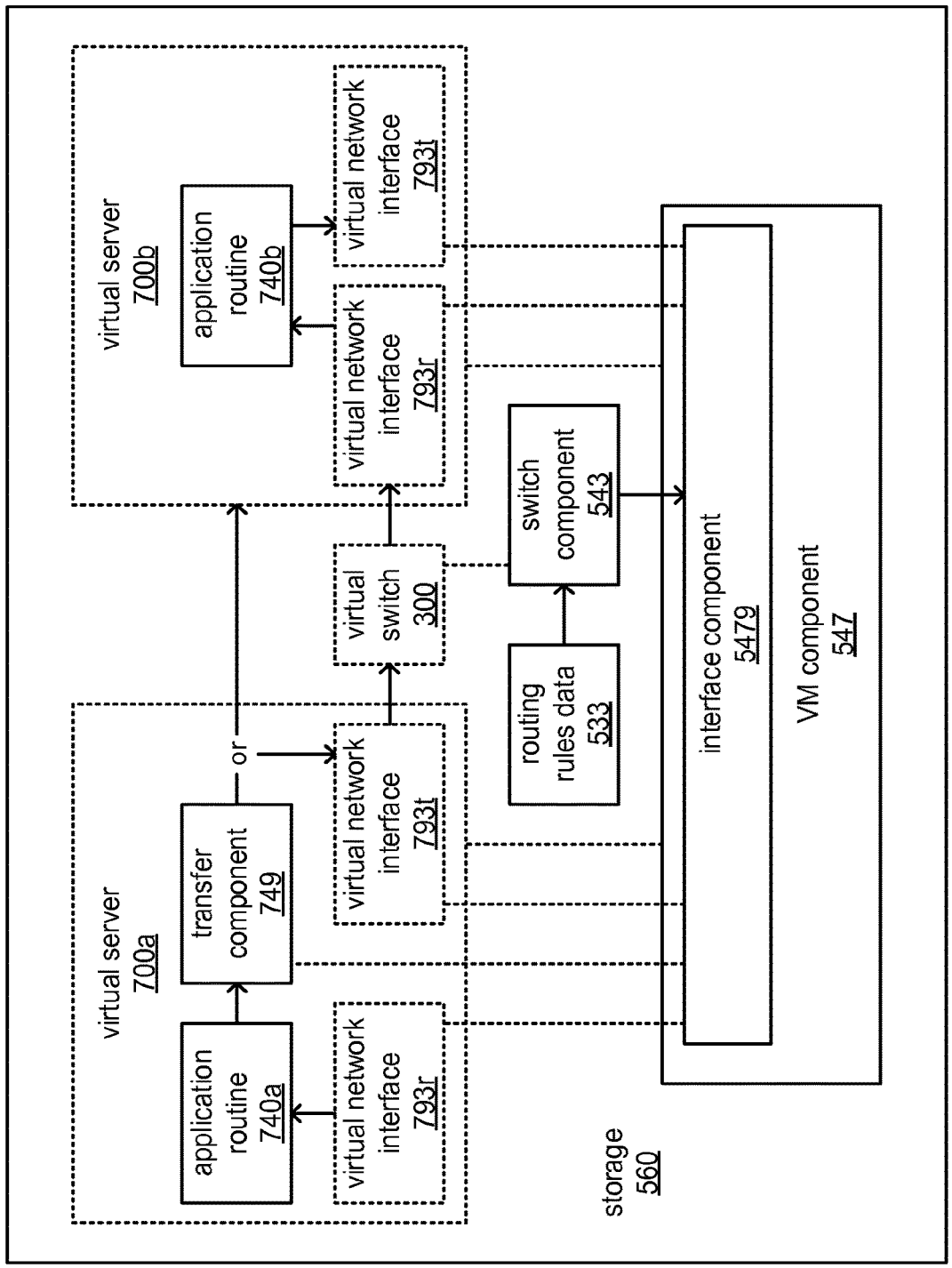
FIGS. 3A, 3B and 3C, together, illustrate an example embodiment of selective triggering of a direct transfer of a set of packets between two virtual servers.
Figure 3B:
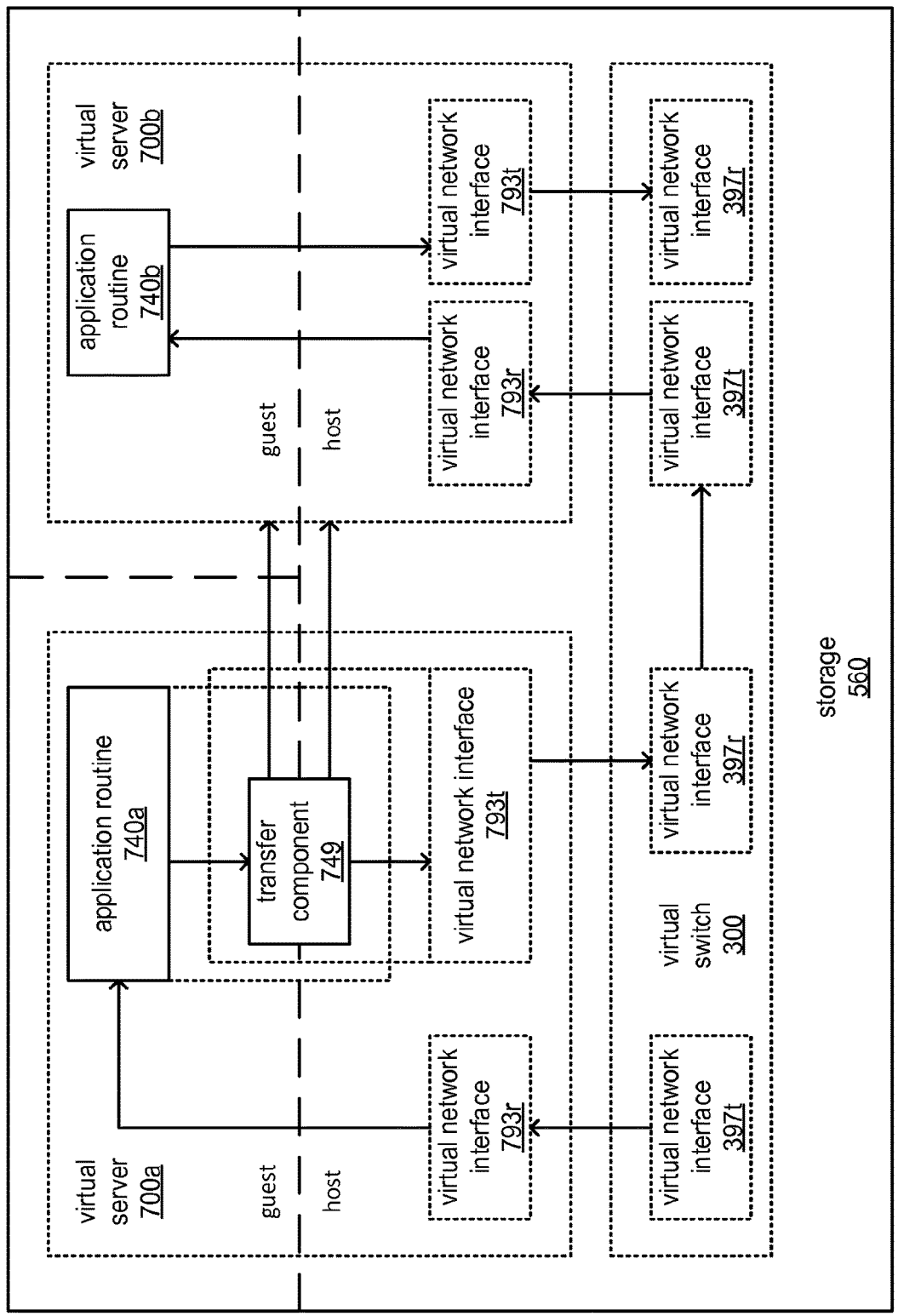

FIGS. 3A and 3B, together, depicts aspects of controlling the manner in which sets of packets are routed between a pair of the virtual servers 700 (labeled specifically as virtual servers 700a and 700b). Among those aspects may be the manner in which each of the virtual network interfaces 793r and/or 793t, instances of the application routine 740, and instances of the transfer component 749 may be allocated to one or both of a host processing environment and a guest processing environment within each of the VMs 567 that are configured as a one of the virtual servers 700a and 700b. Also among those aspects may be the manner in which a subset of routing rules are propagated to each instance of the transfer component 749. Further among those aspects may be the use of such a subset of the routing rules along with an analysis of the content of one or more packets of a set of packets to determine whether to perform a transfer of the set of packets between the virtual servers 700a and 700b.

Turning to FIG. 3A, as previously discussed, execution of the VM component 547 may cause one or more of the processor cores 555 to instantiate one or more VMs 567 and to configure each of those VMs 567 as an instance of a virtual server 700. Also as depicted, such execution of the VM component 547 may entail execution of an interface component 5479 of the VM component 547, which may cause the instantiation and/or operation of the virtual network interfaces 793r and 793t within each of the virtual servers 700. Correspondingly, execution of the switch component 543 may cause one or more of the processor cores 555 to instantiate the virtual switch 300.

As also depicted, the switch component 543 may retrieve indications of rules for routing sets of packets among the virtual servers 700 from the routing rules data 533. Such routing rules may specify multiple tests to perform on the contents of one or more packets of each set of packets (e.g., the contents of the header and/or the payload of those one or more packets) to determine where to route each set of packets. As also previously discussed, each such rule may be made up of specified criteria that a set of packets must meet for the rule to apply, and an action to be taken for all sets of packets that do meet that criteria, including and not limited to, modifying, dropping and/or routing sets of packets meeting that criteria to a particular port address. As previously discussed, packets received from an endpoint device 100 may need to be routed through one or more of the virtual servers 700 in a particular order to enable appropriate forms of processing to be performed on each set of packets before the set of packets is then transmitted by communications server 500 to another endpoint device 100 as part of enabling and maintaining communications between those two endpoint devices 100. The virtual switch 300 may use multiple routing rules indicated within the routing rules data 533 to determine what virtual server 700 to first route a set of packets to upon receipt of that set of packets by the communications server 500, and then what one or more others of the virtual servers 700 to subsequently route that set of packets to as part of causing that set of packets to follow a particular pathway through multiple ones of the virtual servers 700. Thus, the set of routing rules employed by the virtual switch 300 may be relatively complex.

However, as also depicted, an instance of the transfer component 749 may be executed within one of the virtual servers 700 (specifically, the virtual server 700a, as depicted), and may independently determine whether to transfer a set of packets directly to the next one of the virtual servers 700 that is along the pathway to be taken by that set of packets (specifically, the virtual server 700b, as depicted). To enable that instance of the transfer component 749 to make that determination independently of the determinations made by the virtual switch 300 as to where to route each set of packets, the switch component 543, which generates the virtual switch 300 and provides the virtual switch 300 with the routing rules, may relay indications of at least a subset of the routing rules retrieved from the routing rules data 533 to interface component 5479. In turn, the interface component 5479 may relay to the instance of the transfer component 749 executed within the virtual server 700a an indication of a limited subset of routing rules pertinent to determining whether a set of packets processed within the virtual server 700a is to be directly transferred to the virtual server 700b, or not. Such provision of a limited subset of the routing rules to that instance of the transfer component 749 may be in recognition of the fact that the transfer component 749 will only be routing sets of packets that were routed to the virtual server 700a, and not the far wider variety of sets of packets that the virtual switch 300 is to route. Also, it may be deemed desirable to not slow down the rate at which sets of packets progress through the virtual server 700a by causing the transfer component 749 to perform a relatively complex set of tests to identify a wide range of sets of packets that are to be directly transferred to the virtual server 700b. Thus, the subset of routing rules provided to that transfer component 749 may be limited to the extent that there are sets of packets that are meant to progress along their pathways from the virtual server 700a to the virtual server 700b, but which are not recognized as such sets of packets by the transfer component 749, and must therefore be conveyed from the virtual server 700a to the virtual server 700b via the virtual switch 300.

It should also be noted that there may be occasions where one or more routing rules must be changed due to changes in one or more of the virtual servers 700. By way of example, errors detected in one of the virtual servers 700 may result in that virtual server 700 being uninstantiated and then re-instantiated to correct those errors. As a result, that re-instantiated virtual server 700 may be re-instantiated in different memory address(es) within the storage 560 and/or may be designated with a different identifier such that routing rules associated that virtual server 700 prior to its re-instantiation now no longer correctly identify it and/or point to its correct location within the storage 560. In response to such updates, the switch component 543 may provide updated routing rules to the interface component 5479, which may in turn provide an updated subset of the routing rules to the instance of the transfer component 749 executed within the virtual server 700a.

With such routing rules retrieved from the routing rules data 533 and distributed as described, a set of packets received at the virtual switch 300 from an endpoint device through one of the network interfaces 590 of the communications server 500 may be routed by the virtual switch 300 to one or more of the virtual servers 700, including the virtual server 700a. As previously discussed, the set of packets may be routed back to the virtual switch 300 by each of those virtual servers 700, by default, to enable the virtual switch to use the routing rules to determine where next to route the set of packets. However, upon being routed to the virtual server 700*a* and then processed by one of the application routines 740 executed therein (specifically, application routine 740*a*, as depicted), the instance of the transfer component 749 also executed therein may use the subset of routing rules provided to it to determine whether to transfer the set of packets back to the virtual switch to be routed elsewhere as would others of the virtual servers 700, or to transfer the set of packets directly to the virtual server 700*b*.

Turning to FIG. 3B, in various embodiments, the instance of the transfer component 749 executed within the virtual server 700*a* may be incorporated into the application routine 740*a* also executed within the virtual server 700*a*, may be incorporated into the virtual network interface 793*t* generated within the virtual server 700*a*, or may be not be incorporated into either (as depicted by the dotted lines alternately extending from each to surround this instance of the transfer component 749). Further, the instance of the transfer component 749 may be executed within the portion of the virtual server 700*a* that is made up of a portion of one of the VMs 567 that is executed within the host processing environment of the communications server 500, which may be the host processing environment in which the virtual switch 300 is generated. Alternatively, this instance of the transfer component 749 may be executed within the portion of the virtual server 700*a* that is made up of a portion of the same one of the VMs 567 that is executed within a guest processing environment generated as part of generating that one of the VMs 567, which may be the guest processing environment in which the application routine 740*a* is executed. As familiar to those skilled in the art of VM architectures, portions of a VM may straddle both a host processing environment and a guest processing environment generated as part of generating that VM, and as depicted with a dashed line, this instance of the transfer component 749 may be executed within either in different embodiments. If this instance of the transfer component 749 is executed within the host processing environment, then as depicted, the transfer of a set of packets from the virtual server 700*a* to the virtual server 700*b* may occur within the host processing environment. Alternatively, if executed within the guest processing environment, then as depicted, the transfer may occur between the guest processing environment of the virtual server 700*a* and the corresponding guest processing environment of the virtual server 700*b*.

Figure 3C:
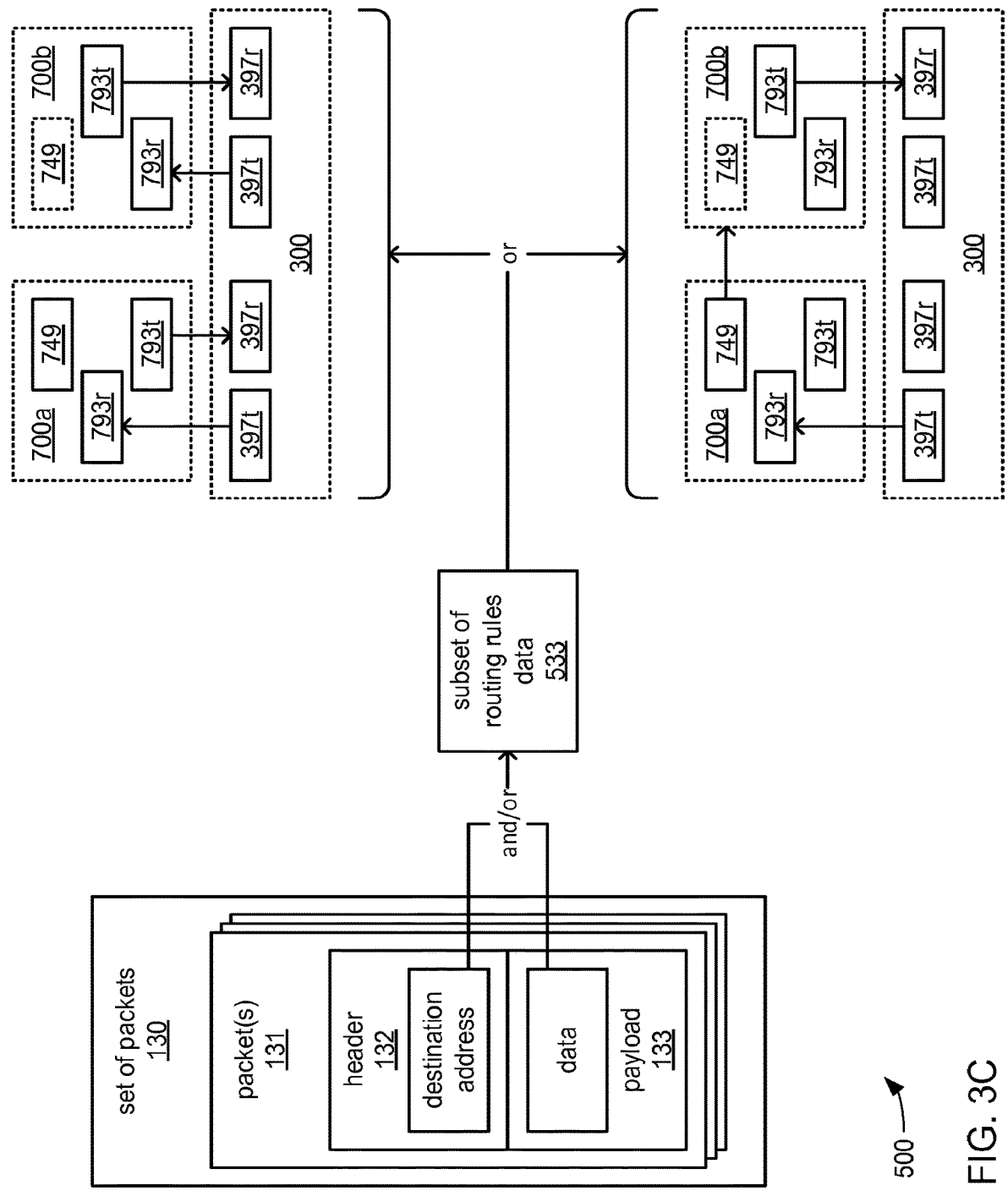

FIG. 3C depicts an example of selecting whether or not to route a set of packets 130 from the virtual server 700*a* to the server 700*b* either through the virtual switch 300 or directly therebetween based on the contents of one or more of the packets 131 making set of packets 130. By way of example, and as specified by the subset of routing rules provided to the instance of the transfer component 749, this determination may be based on one or more destination addresses found within the header 132 of at least one of the packets 131 and/or may be based on a type or size of data found within the payload 133 of at least one of the packets 131.

Figure 4A:
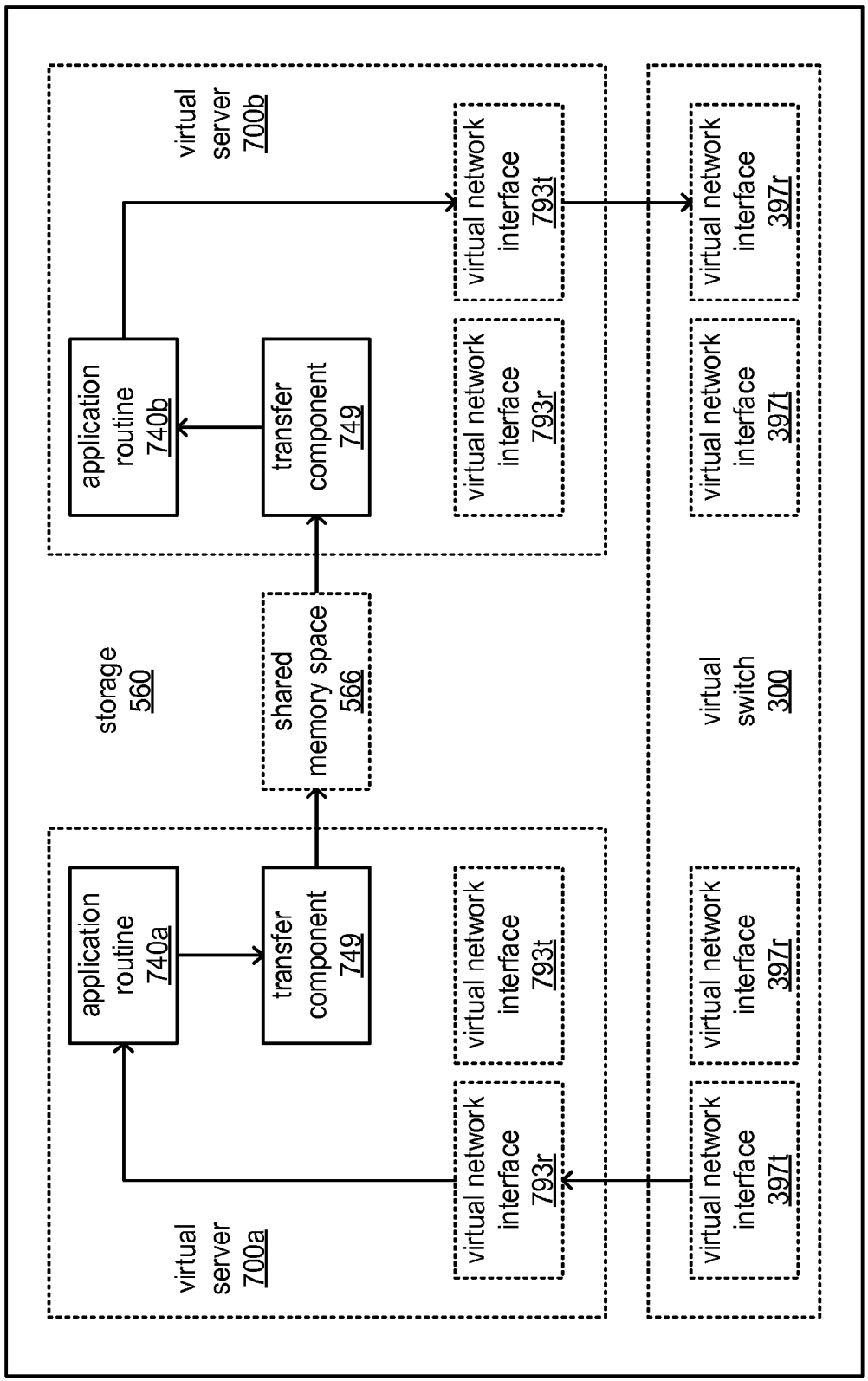
FIGS. 4A, 4B and 4C each illustrate an example embodiment of directly transferring a set of packets between two virtual servers.
Figure 4B:
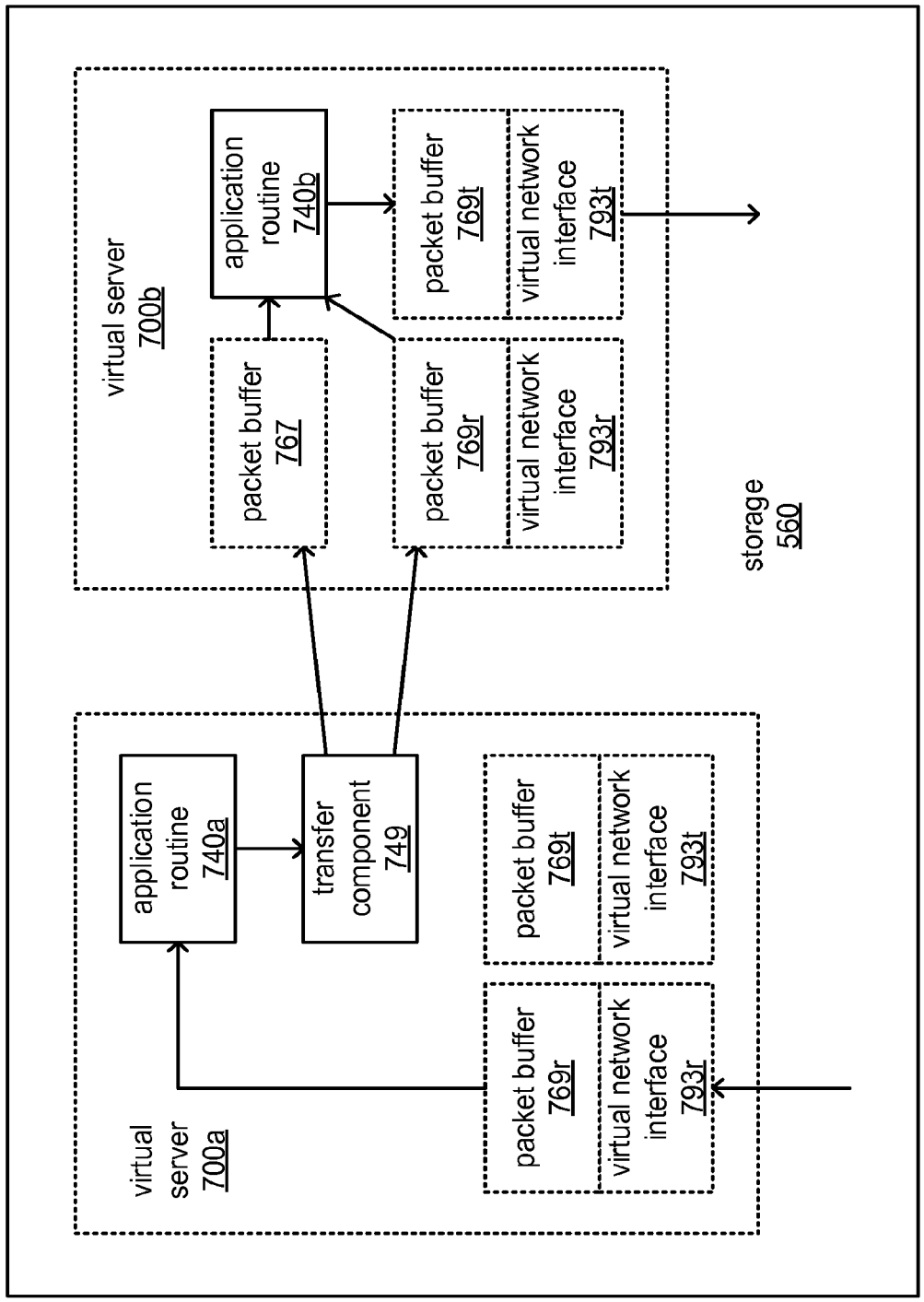
Figure 4C:
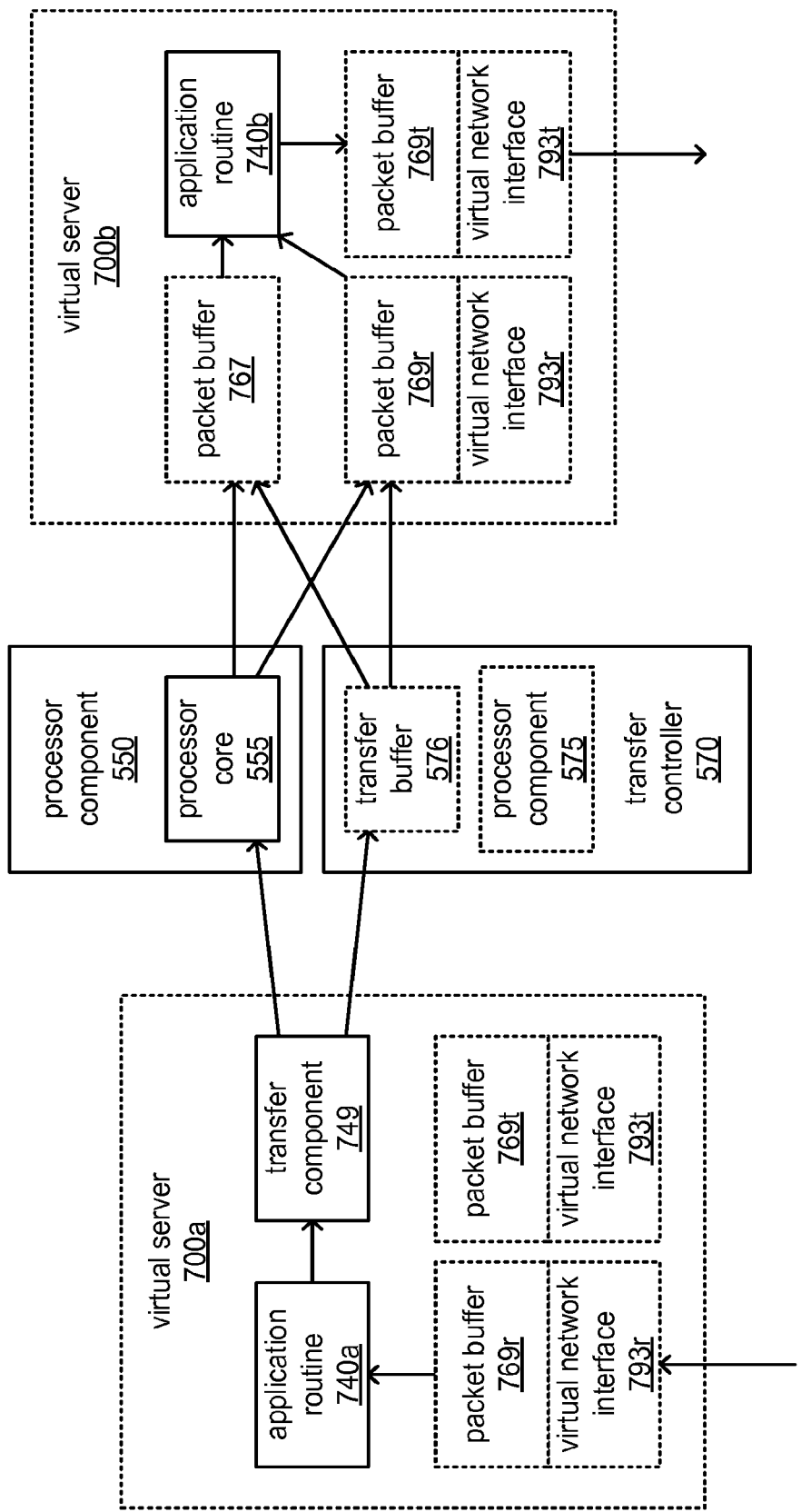

FIGS. 4A, 4B and 4C, together, depict additional aspects of the direct transfer of a set of packets from the virtual server 700*a* and to the virtual server 700*b*, as depicted and discussed above in reference to FIGS. 3A-B. Among those aspects are different embodiments of mechanisms by which to effect such a direct transfer.

Turning to FIG. 4A, as previously discussed, execution of the VM component 547 may cause one or more of the processor cores 555 to instantiate one or more VMs 567 and to configure each of those VMs 567 as an instance of a virtual server 700. Also as depicted, such execution of the VM component 547 may entail execution of an interface component 5479 of the VM component 547, which may cause the instantiation and/or operation of the virtual network interfaces 793*r* and 793*t* within each of the virtual servers 700. However, execution of the interface component 5479 may also cause the instantiation of a shared memory space 566 within a portion of the storage 560, and the memory space 566 may be so defined to not coincide with the memory spaces within the storage 560 in which either of the virtual servers 700*a* or 700*b* are defined. Further, execution of the interface component 5479 may also cause the granting of access permissions to each of the virtual servers 700*a* and 700*b* to access the shared memory space 566 while not allowing any routine executed within either of the virtual servers 700*a* or 700*b* to access any part of the memory space allocated to the other.

Thus, upon determining that a set of packets is to be directly transferred from the virtual server 700*a* to the virtual server 700*b*, the instance of the transfer component 749 executed within the virtual server 700*a* is able to access the shared memory space 566 to store the set of packets within the shared memory space 566. Any of a variety of types of signaling and/or other protocol may then be used to cause an instance of the transfer component 749 executed within the virtual server 700*b* to access the shared memory space 566 to retrieve that set of packets. In this way, a set of packets may be directly transferred without allowing malicious and/or errant actions of instructions executed within one of the virtual servers 700*a* and 700*b* to gain sufficient access to the other of the virtual servers 700*a* and 700*b* to cause unauthorized and/or errant alterations thereto.

Turning to FIG. 4B, as depicted, one or more of the virtual network interfaces 793*r* and/or 793*t* may be paired with a packet buffer 769*r* and/or 769*t*, respectively, to buffer packets as they are received by one or more of the virtual servers 700 for processing and/or as they are transmitted by one or more of the virtual servers 700 following processing. Packets received by one of the virtual network interfaces 793*r* from the virtual switch 300 may be buffered within an associated one of the packet buffers 769*r* prior to being emptied therefrom by an application routine 740 for processing, and packets processed by that application routine 740 may be placed in one of the packet buffers 769*t* for transmission by an associated one of the virtual network interfaces 793*t* to the virtual switch 300.

As an alternative to instantiating the shared memory space 566 at a location within the storage 560 that is entirely outside the memory spaces allocated to each of the virtual servers 700*a* and 700*b*, execution of the interface component 5479 of the VM component 547 may cause the defining of a portion of the memory space allocated to the virtual server 700*b* as being a shared memory space accessible to the instance of the transfer component 749 executed within the virtual server 700*a*. In some embodiments, this shared memory space may be defined to coincide with the location of the packet buffer 769*r* associated with the virtual network interface 793*r* of the virtual server 700*b*. In such embodiments, that packet buffer 769*r* would then be used to buffer packets received either through its associated virtual network interface 793*r* from the virtual switch 300 or directly from the virtual server 700*a*. In other embodiments, this shared memory space may be defined elsewhere within the memory space of the virtual server 700*b* to define a separate packet buffer 767 for the receipt of packets directly from the virtual server 700*a*.

Regardless of where the shared memory space is defined within the memory space allocated to the virtual server 700*b*, one or more security measures may be taken in the operation of the virtual server 700*a* to prevent malicious and/or errant actions of instructions executed within one of the virtual servers 700*a* and 700*b* from gaining sufficient access to the other of the virtual servers 700*a* and 700*b* to cause unauthorized and/or errant alterations thereto. As previously discussed, the instance of the transfer component 749 executed within the virtual server 700*a* may be executed within one or the other of the host processing environment or the guest processing environment allocated to the VM 567 configured as the virtual server 700*a*. In some embodiments, where the transfer component 749 is deemed to be trusted code to at least some degree, the instance of the transfer component 749 may be executed within the host processing environment within the virtual server 700*a* to provide that instance of the transfer component 749 with some degree of isolation from the application routine 740*a* executed within the guest processing environment of the virtual server 700*a*.

Alternatively or additionally, different ones of the memory spaces occupied by at least the application routine 740*a* and the instance of the transfer component 749 executed within the virtual server 700*a* may be designated as executable at different times to prevent both from being able to be executed at the same time. Thus, the memory space occupied by the application routine 740*a* may be made designated as an executable memory space to enable the application routine 740*a* to be executed to process packets of a set of packets while the memory space occupied by the instance of the transfer component within the virtual server 700*a* may be designated as non-executable memory space to prevent its execution. At other times, the designations of these two memory spaces may then be reversed to prevent execution of the application routine 740*a* while the instance of the transfer component 749 within the virtual server 700*a* executes to determine whether to transfer the set of packets to the virtual server 700*b*, and to then perform that transfer if the determination is to do so.

Turning to FIG. 4C, again, one or more of the virtual network interfaces 793*r* and/or 793*t* may be paired with one or more of the packet buffers 769*r* and/or 769*t*, respectively, and/or a separate packet buffer 767 may be defined elsewhere within the memory space allocated to the virtual server 700*b*. As an alternative to the instance of the transfer component 749 executed within the virtual server 700*a* accessing any shared memory location to effect a direct transfer of a set of packets from the virtual server 700*a* to the virtual server 700*b*, that instance of the transfer component 749 may signal a processor core 555 of one of the processor components 550 or may signal the transfer controller 570 with a request for one or the other to perform the transfer.

In embodiments in which a processor core 555 is signaled with such a request, the signaling may take the form of an instruction of the instruction set of that processor core 555 for causing and/or performing a transfer of data between VMs. Such an instruction may include fields defined therein to hold source and/or destination addresses, and/or some other form of identifier of source and/or destination VMs. In such embodiments, that processor core 555 may perform a check of a table or other data structure (e.g., a portion of the routing rules data 533, or a data structure derived therefrom) to determine whether a transfer sought to be invoked through use of that instruction is permissible, or not. If permissible, then that processor core 555 may proceed with performing the transfer. However, if not permissible, then that processor core 555 may return an indication of an error to the instance of the transfer component 749 that used the instruction.

In embodiments in which the transfer controller 570 is signaled with such a request, the signaling may take the form of writing an indication of source and/or destination addresses, and/or source and/or destination identifiers of VMs into registers and/or a transfer buffer 576 of the transfer controller 570. The processor component 575 (or other logic within the transfer controller 570 where the transfer controller does not include a processor component) may perform a check of a table or other data structure to determine whether a transfer sought to be invoked through use of that instruction is permissible, or not. If permissible, then the processor component 575 (or other logic) may proceed with performing the transfer. However, if not permissible, then the processor component 575 (or other logic) may return an indication of an error to the instance of the transfer component 749 that used the instruction. It may be that the transfer controller 570 is operable in a manner akin to a direct memory access (DMA) controller, but with the ability to transfer data between VMs and/or the ability to perform a check as to whether a requested transfer is permissible. Alternatively or additionally, the transfer controller 570 may be a trusted computing module (TCM) of the communications server 500 that performs various functions to prevent various hardware and/or software components of the communications server 500 from being corrupted and/or otherwise manipulated by malicious software, such as encryption/decryption, preventing unauthorized accesses between different processing environments, etc. As a TCM, the transfer controller 570 may be deemed ideally suited to reliably performing checks of whether each requested transfer of a set of packets between VMs is permissible, or not. In performing such transfers, the transfer controller 570 may define a portion of its own storage (not shown) as the transfer buffer 576 to buffer a set of packets (e.g., the set of packets 130) as that set is transferred.

Figure 5A:
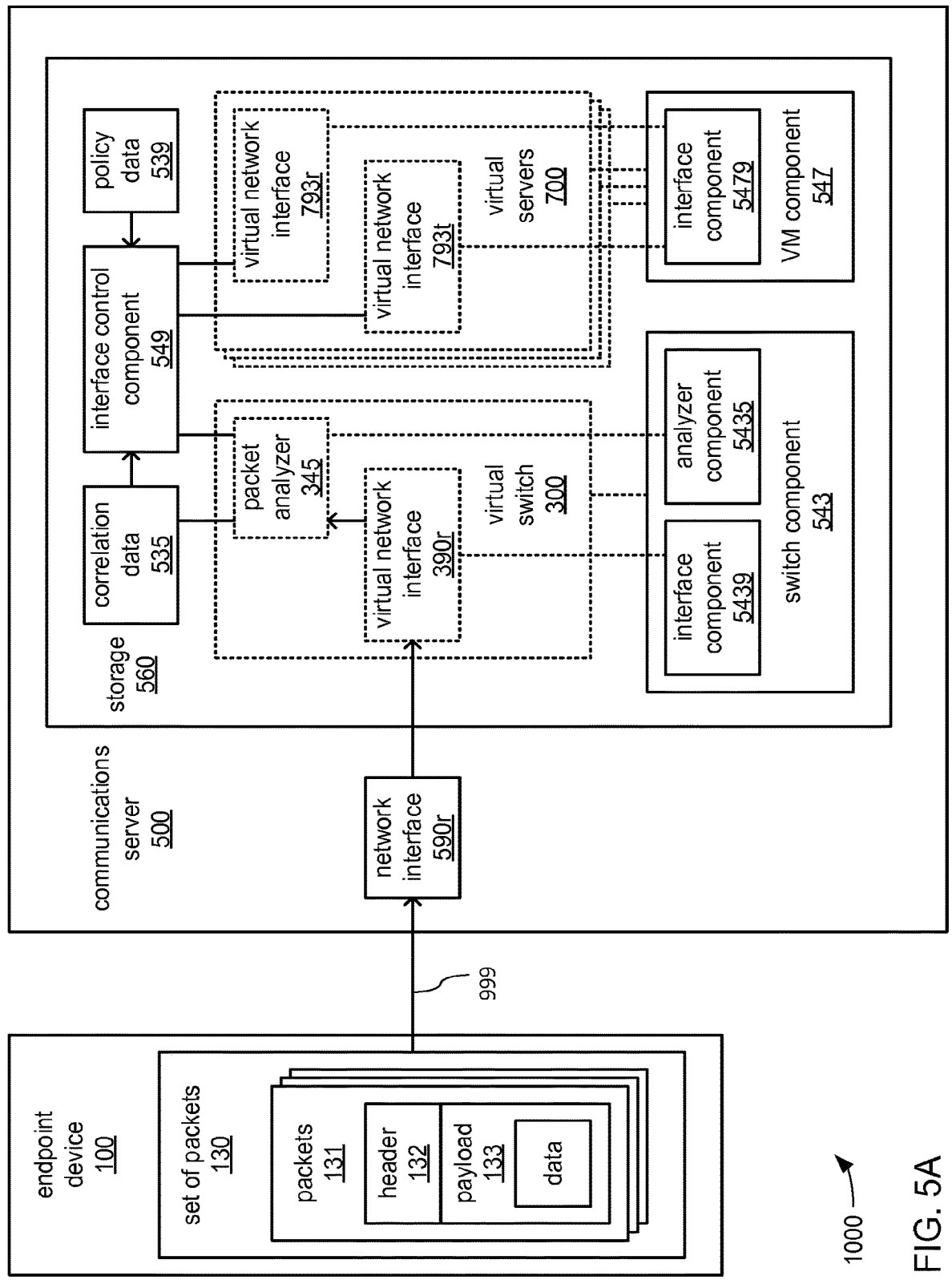
FIGS. 5A and 5B, together, illustrate an example embodiment of using learned pathway of sets of packets to control virtual network interfaces.
Figure 5B:
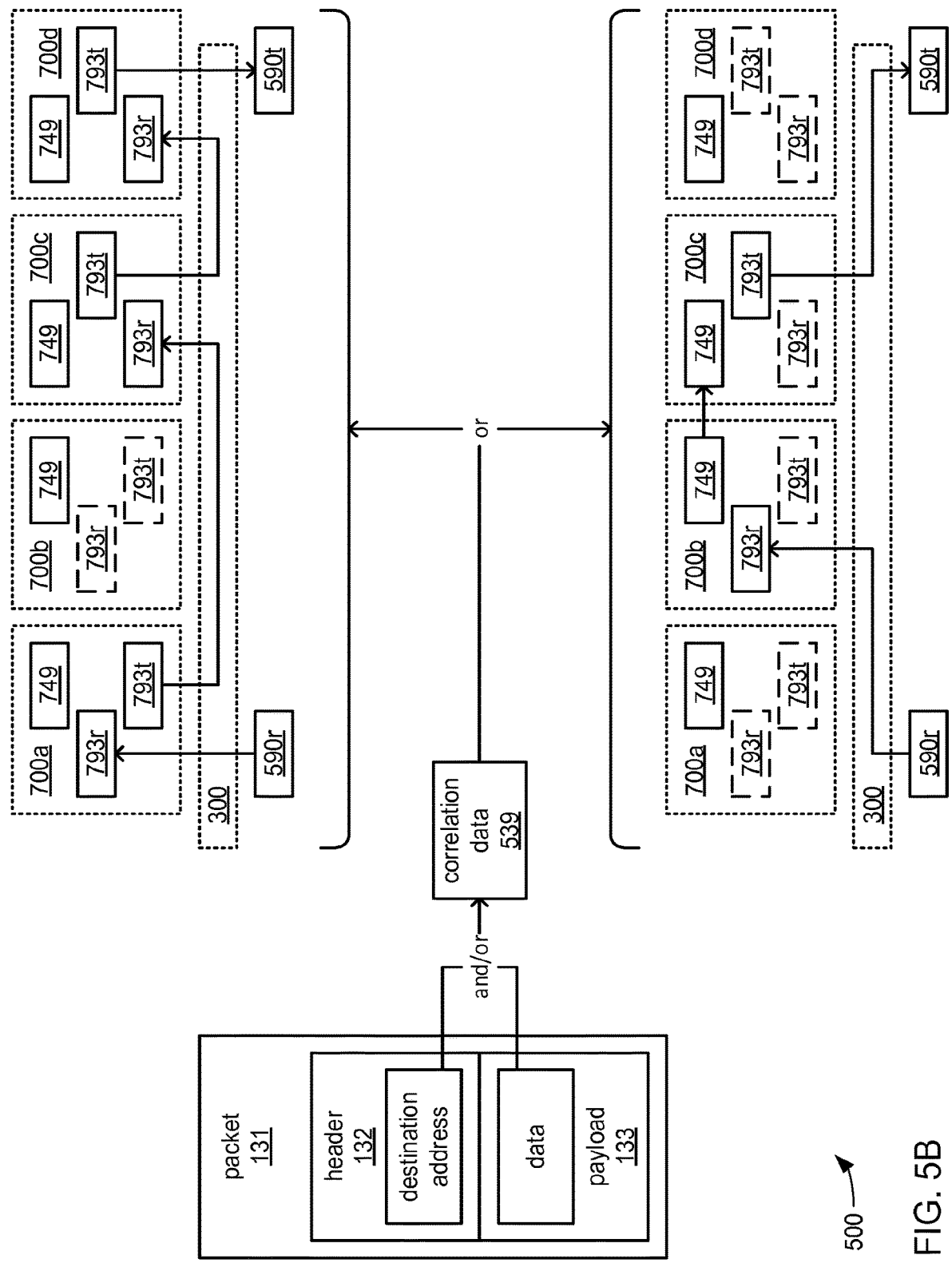

FIGS. 5A and 5B, together, depict aspects of dynamic selection of different virtual network interfaces to operate in a polling mode for a particular set of packets 130 where at least two of the virtual servers 700 are able to directly exchange a set of packets. Among those aspects is analyzing a header 132 and/or a payload 133 of one or more packets 131 that make up the set of packets 130 received at a network interface 590 of the communications server 500. Also among those aspects is dynamically configuring virtual network interfaces of one or more of the virtual servers 700 to operate in a polling mode based at least in part on which ones of the virtual servers 700 are able to exchange packets directly.

Turning to FIG. 5A, as previously discussed, execution of the VM component 547 may cause one or more of the processor cores 555 to instantiate one or more VMs 567 and to configure each of those VMs 567 as an instance of a virtual server 700. Also as depicted, such execution of the VM component 547 may entail execution of the interface component 5479 of the VM component 547, which may cause the instantiation and/or operation of the virtual network interfaces 793*r* and 793*t* within each of the virtual servers 700. Correspondingly, execution of the switch component 543 may cause one or more of the processor cores 555 to instantiate the virtual switch 300. Also as depicted, such execution of the switch component 543 may entail execution of an interface component 5439 of the switch component 543, which may cause the instantiation and/or operation of at least the virtual network interface 390*r* within the virtual switch 300. Further, such execution of the switch component 543 may entail execution of an analyzer component 5435 by one or more of the processor cores 555, which may cause instantiation and/or operation of a packet analyzer 345 in cooperation with the virtual network interface 390r.

In response to the receipt of the set of packets 130 by the virtual network interface 390r from one of the endpoint devices through the network 999 and the network interface 590r, the packet analyzer 345 may analyze the contents of at least one of the packets 131 of the set of packets 130. More specifically, the packet analyzer 345 may analyze the header 132 of one or more of the packets 131 for indication(s) of a destination address. Alternatively or additionally, the packet analyzer 345 may analyze data carried within the payload 133 of one or more of the packets 131 for indication(s) of one or more types of data and/or one or more sizes of different portions of data conveyed therein. The packet analyzer 345 may then attempt to correlate such destination address(es), type(s) of data and/or data size(s) to a known pathway by which the set of packets 130 is to proceed through one or more of the virtual servers 720. In so doing, the packet analyzer 345 may retrieve from the correlation data 535 indications of known correlations of known destination addresses, known types of data and/or known data sizes to one or more of known pathways that different sets of packets may take to determine the pathway that the set of packets 130 is to take.

Upon determining the pathway to be taken by the set of packets 130 through one or more of the virtual servers 700, the packet analyzer 345 may provide an indication of that pathway to the interface control component 549. The interface control component 549 may employ such an indication of the pathway to selectively configure the virtual network interfaces 793r and 793t of the ones of the virtual servers 700 that are along that pathway to operate in a polling mode to minimize the latencies imposed by each of those virtual network interfaces 793r and 793t as the set of packets 130 progresses along that pathway. The interface control component 549 may also employ such an indication of the pathway to selectively configure the virtual network interfaces 793r and 793t of one or more of the virtual servers 700 that are not along that pathway to operate in a non-polling mode (e.g., an inter-driven mode) to minimize the use of processing resources and electric power for virtual network interfaces that are not along that pathway.

It should be noted that the interface control component 549 may also dynamically operate the virtual network interface 390t of the virtual switch 300 in either a polling mode or a non-polling mode based on whether there are currently any sets of packets proceeding through one or more of the virtual servers 700 such that the virtual network interface 390t will be used to transmit one or more sets of packets to the network interface 590t of the communications server 500 for transmission to an endpoint device 100 via the network 999. However, in embodiments where the interface control component 549 retrieves timing information concerning the amount of time required to process sets of packets through one or more of the virtual servers 700, the interface control component 549 may use such indications of timing to control when the virtual network interface 390t is operated in the polling mode based on when one or more sets of packets are expected to pass therethrough.

However, as has been discussed at length, one or more of the virtual servers 700 may execute an instance of the transfer component 749 to dynamically determine whether each set of packets (e.g., the set of packets 130) following processing by one of the application routines 740, is to be transferred back to the virtual switch 300 or directly to another of the virtual servers 700. Where there is such an ability to directly transfer a set of packets between two of the virtual servers 700, there may be no need to configure the virtual network interfaces 793t and 793r by which the set of packets would otherwise be indirectly transferred through the virtual switch in a polling mode, since neither would be used. In some embodiments, the packet analyzer 345 may take into account what virtual network interfaces 793r and 793t will not be used as a result of the abilities of at least some of the virtual servers 700 to engage in such direct transfers.

FIG. 5B depicts an example of selecting from among at least two possible pathways that may be followed through up to four virtual servers 700 (numbered 700a through 700d) by the set of packets 130 based on a correlation found in the correlation data 535 and a destination address found within the header 132 and/or of a type of data found within the payload 133 of at least one of the packets 131. A first one of the two pathways may proceed through the virtual servers 700a, 700c and 700d, while the second one of the two pathways may proceed through the virtual servers 700b and 700c. FIG. 5B also specifically depicts the ability of virtual server 700b to directly transmit the set of packets 130 to virtual server 700c, thereby bypassing the virtual switch 300, entirely. Thus, a portion of the second one of the two pathways is able to proceed directly from the virtual server 700b to the virtual server 700c without "looping through" the virtual switch 300.

In some embodiments, the packet analyzer 345 may take into account this ability of the virtual servers 700b and 700c to directly exchange packets when selecting various ones of the virtual network interfaces 793r and/or 793t to place into a polling mode upon determining a pathway that a set of packets is to take through one or more of the virtual servers 700. It may be that the correlation data 535 and/or the policy data 539 include indications of which ones of the virtual servers 700 are able to engage in such a direct exchange of packets. Such indications may also specify various conditions under which such a direct exchange of a set of packets may take place in lieu of exchanging that set of packets through the virtual switch 300.

Therefore, where the packet analyzer 345 determines that the set of packets 130 is to take the first one of these two pathways, the packet analyzer 345 may cause the interface control component 549 to configure the virtual network interfaces 793r and 793t within each of the virtual servers 700a, 700c and 700d to operate in a polling mode (indicated with solid lines), while continuing to leave the virtual network interfaces 793r and 793t within the virtual server 700b operating in a non-polling mode (indicated with dashed lines). This is unchanged from what was shown in FIG. 4B. However, where the packet analyzer 345 determines that the set of packets 130 is to take the second one of these two pathways, the packet analyzer 345 may cause the interface control component 549 to configure the virtual network interface 793r within the virtual server 700b and the virtual network interface 793t within the virtual server 700c to operate in a polling mode (indicated with solid lines), while continuing to leave the virtual network interface 793t of the virtual server 700b, the virtual network interface 793r of the virtual server 700c, and both of the virtual network interfaces 793r and 793t within each of the virtual servers 700a and 700d operating in a non-polling mode (indicated with dashed lines). Thus, the ability of the virtual server 700b to directly transmit packets to the virtual server 700c without involving the virtual switch 300 enables the virtual network interface 793t of the virtual server 700b and the virtual network interface 793r of the virtual server 700c to continue to operate in a non-polling mode, thereby reducing processing requirements and/or electric power consumption.

Figure 6A:
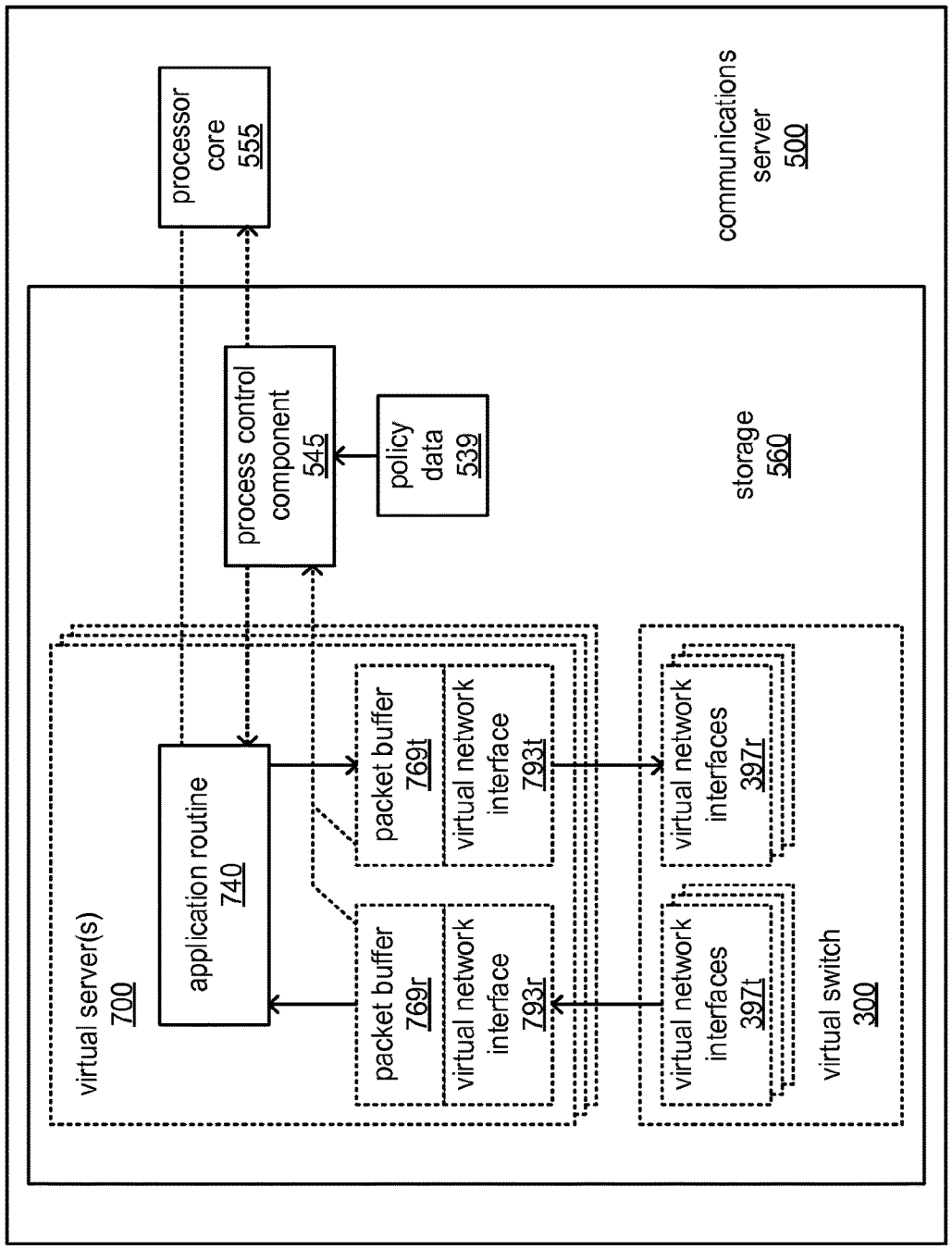
FIGS. 6A and 6B, together, illustrate an example embodiment of using levels of fullness of packet buffers to control a rate at which packets are processed.
Figure 6B:
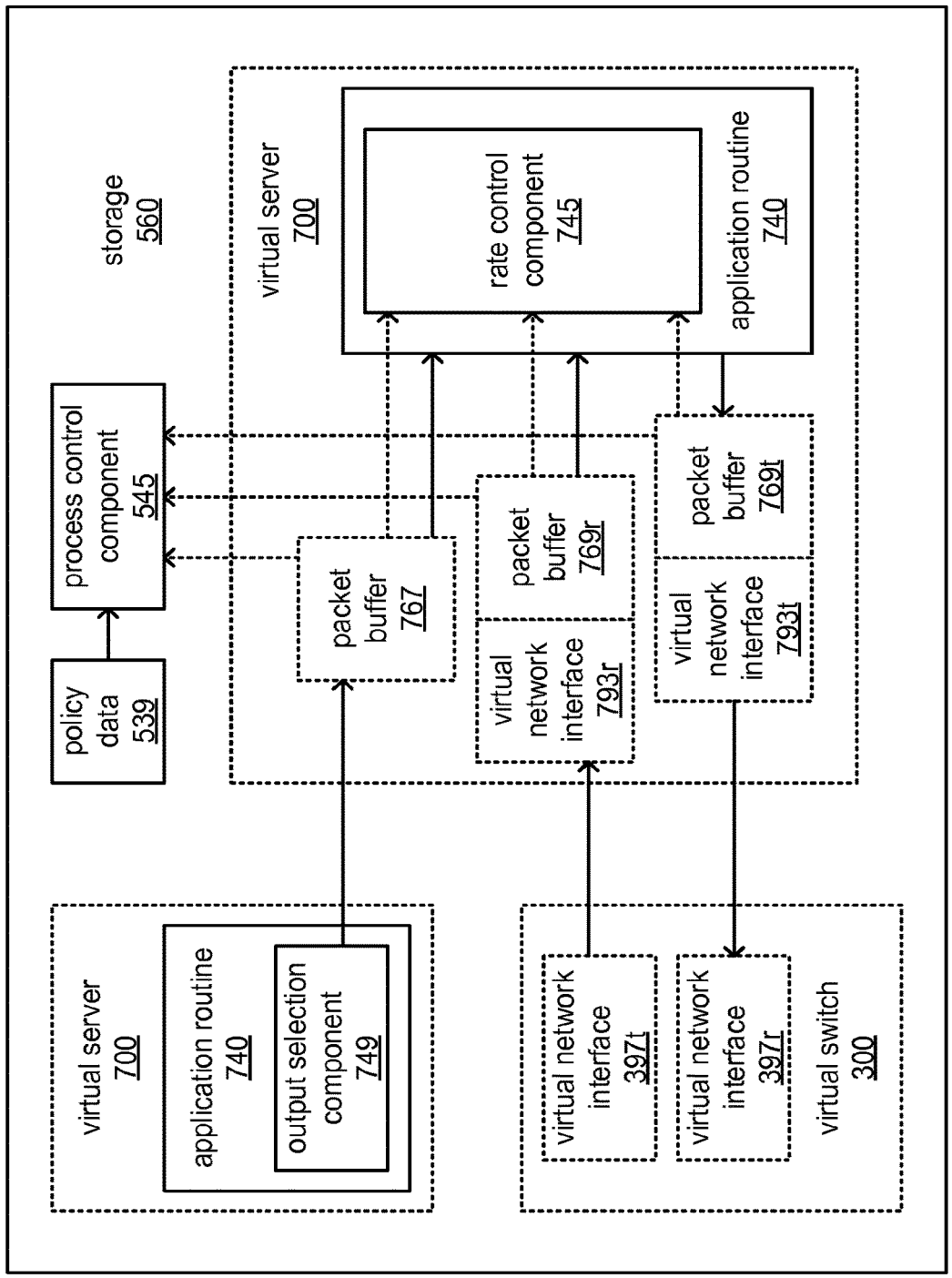

FIGS. 6A and 6B depicts aspects of controlling the rate of processing of packets within one of the virtual servers 700 based on the degree of fullness of one or more packet buffers. Among those aspects are monitoring the level of fullness in at least one of the packet buffers 769r and 769t, and recurringly comparing the level of fullness to one or more thresholds. Also among those aspects is similarly monitoring the level of fullness in the packet 767 by which one of the virtual servers 700 may receive packets directly from another of the virtual servers 700, instead of from the virtual switch 300. Further among those aspects is either changing what instructions are executed within one of the virtual servers 700 and/or changing the rate at which instructions are executed within one of the virtual servers 700 based on the results of the recurring comparison.

Turning to FIG. 6A, in some embodiments, within each of the virtual servers 700, execution of the application routine 740 by one or more of the processor cores 555 may cause monitoring of the degree of fullness of the buffers 769r and/or 769t under the control of that one or more processor cores 555. In response to the level of fullness of one or the other of these two buffers exceeding and/or falling below a threshold, the one or more processor cores 555 that execute the application routine 740 may be caused to execute instructions other than those of the application routine 740 that perform processing operations on packets. More specifically, the relative amounts of instructions of the application routine 740 that are associated with processing packets and of the other instructions may be varied to increase or decrease the rate at which the instructions of the application routine 740 associated with processing packets may be executed at a greater or lesser pace to accordingly increase or decrease the rate at which packets are processed.

In other embodiments, indications of the degree of fullness of the buffers 769r and/or 769t within each of the virtual servers 700 may be recurringly provided to the process control component 545 of the control routine 540. The process control component 545 may then signal one or more of the application routines 740 executed within corresponding one(s) of the virtual servers 700 to increase and/or decrease the rate at which packets are processed by varying the relative quantities of instructions associated with processing packet and instructions that are not, as just described. Alternatively, the process control component 545 may then signal one or more of the processor cores 555 that execute one or more of the application routine 740 within one or more of the virtual servers 700 to vary the speed at which instructions of the one or more of the application routines 740 are executed.

Regardless of the exact manner in which the rate of processing of packets may be varied, the policy data 539 may include indications of the threshold(s) against which the degrees of fullness of each of the buffers 769r and 769t are recurringly compared to determine whether a buffer overflow and/or underflow is about to occur. Where the process control component 545 receives indications of the degree of fullness of each of these buffers, the process control component 545 may retrieve and directly use such indications from the policy data 539. However, where the individual application routines 740 are provided with such indications of fullness, the process control component 545 may relay such indications of threshold(s) to each of the application routines 740.

However, turning to FIG. 6B, and as has been discussed at length, execution of the VM component 547 and/or of at least one of the application routines 740 may result in the instantiation of two of the virtual servers 700 with an ability for those two virtual servers 700 to have access to an amount of shared memory. For example, and as depicted, this shared memory may be utilized in a manner that defines the additional buffer 767 by which an instance of the transfer component 749 of one of the two virtual servers 700 is able to provide packets to the other of the two virtual servers 700. In such embodiments, the rate control component 745 of the application routine 740 executed within the receiving one of these two virtual servers 700 may monitor the level of fullness of packets within the buffer 767. The rate control component 745 may recurringly compare that level of fullness to one or more thresholds and act on the results of those comparisons in a manner similar to what has been described above for the buffers 769r and 769t, such that a level of fullness falling below a buffer underflow threshold or rising above a buffer overflow threshold may be responded to by varying the rate at which packets are processed by the application routine 740. Alternatively, indications of the level of fullness of the buffer 767 may be recurringly provided to the process control component 545 to enable the process control component 545 to perform such recurring comparisons and to take such action as has been described to vary the rate at which packets are processed by the application routine 740.

In still other embodiments, instead of a separate buffer 767 being created, the amount of memory that is shared between the two virtual servers 700 may be defined to coincide with the location of the buffer 769r of the one of these two virtual servers 700 that receives packets transmitted directly to it by the output selection component 749 within the other. In such other embodiments, the buffer 769r would remain the buffer by which the receiving one of these two virtual servers 700 receives packets, regardless of whether they are received directly from the other virtual server 700 or through the virtual switch 300.

In various embodiments, the processor component 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of the interface(s) 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
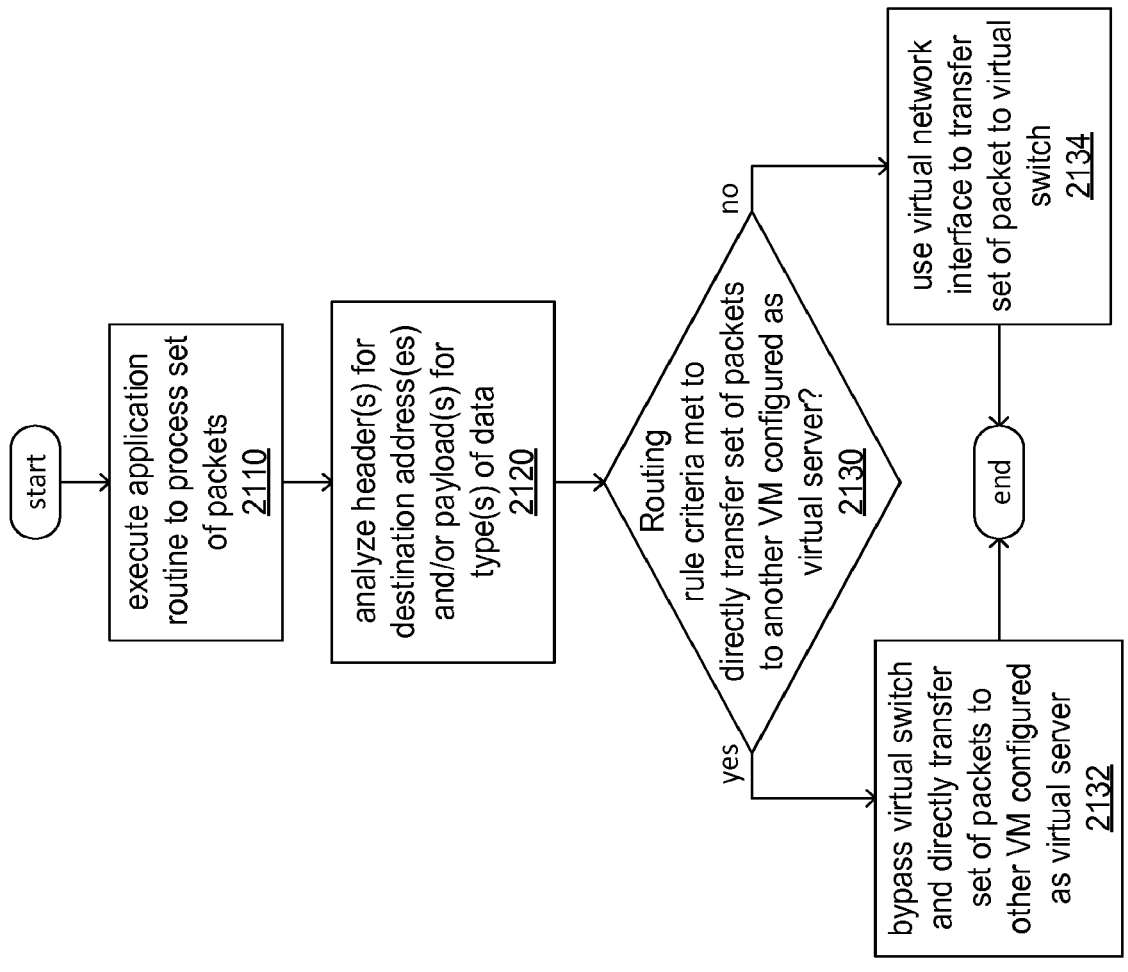
FIGS. 7, 8, 9, 10 and 11 each illustrates a logic flow according to an embodiment.

FIG. 7 illustrates an embodiment of a logic flow 2100. The logic flow 2100 may be representative of some or all of the operations executed by one or more embodiments described herein. More specifically, the logic flow 2100 may illustrate operations performed by one or more of the processor components 550 in executing at least the control routine 540 and/or the transfer component 749, and/or performed by other component(s) of the communications server 500. In particular, the logic flow 2100 is focused on operations to route packets in greater detail.

At 2110, at least one processor core of at least one processor component of a communications server (e.g., at least one processor core 555 of at least one of the processor components 550 of the communications server 500) executes instructions of an application routine within a VM configured as a virtual server (e.g., one of the application routines 740 within one of the VMs 567 configured as one of the virtual servers 700) to perform one of a variety of forms of processing of a set of packets. As has been discussed, endpoint devices of a communications system (e.g., the endpoint devices 100 of the communications system 1000) may engage in communications by exchanging sets of packets through a network and at least one communications server of the communications system. As has also been explained, within such a communications server may be instantiated multiple VMs that are each configured as a virtual version of what was once a physically distinct server to perform a different processing operation on the packets to establish and/or support communications among the endpoint devices.

At 2120, the at least one processor core and/or at least one other processor core of either the same processor component or a different processor component of the communications server analyzes may analyze the contents and/or payload of one or more packets of the set of packets (e.g., the destination addresses, data types and/or data sizes thereof). That same at least one processor core may use the destination address(es), data type(s) and/or data size(s) to determine if the set of packets comes under a routing rule that results in that set of packets being eligible for being directly transferred to another VM that is also configured as a virtual server, rather than be transferred to a virtual switch generated within the communications server (e.g., the virtual switch 300) by default to allow the virtual switch to determine where next to route the set of packets to. As has been discussed, such an analysis and determination may be carried out by a transfer component that may be executed within a portion of the VM within the host environment associated with or guest environment, each of which may be associated with a different processor core from the other.

At 2130, a check is made as to whether the criteria of that routing rule are met by contents of that set of packets for being directly transferred to the other VM configured as a virtual server. If so, then the set of packets is so directly transferred at 2132 in a manner that bypasses the virtual switch entirely. As has been discussed, such a direct transfer may be effected using a shared memory space that is shared between the two VMs, through use of a transfer controller and/or through use of a transfer instruction supported by one of the processor cores within the communications server. However, if not, then the set of packets is transferred to the virtual switch using a virtual network interface of the virtual server (e.g., the virtual network interface 793*t*).

Figure 8:
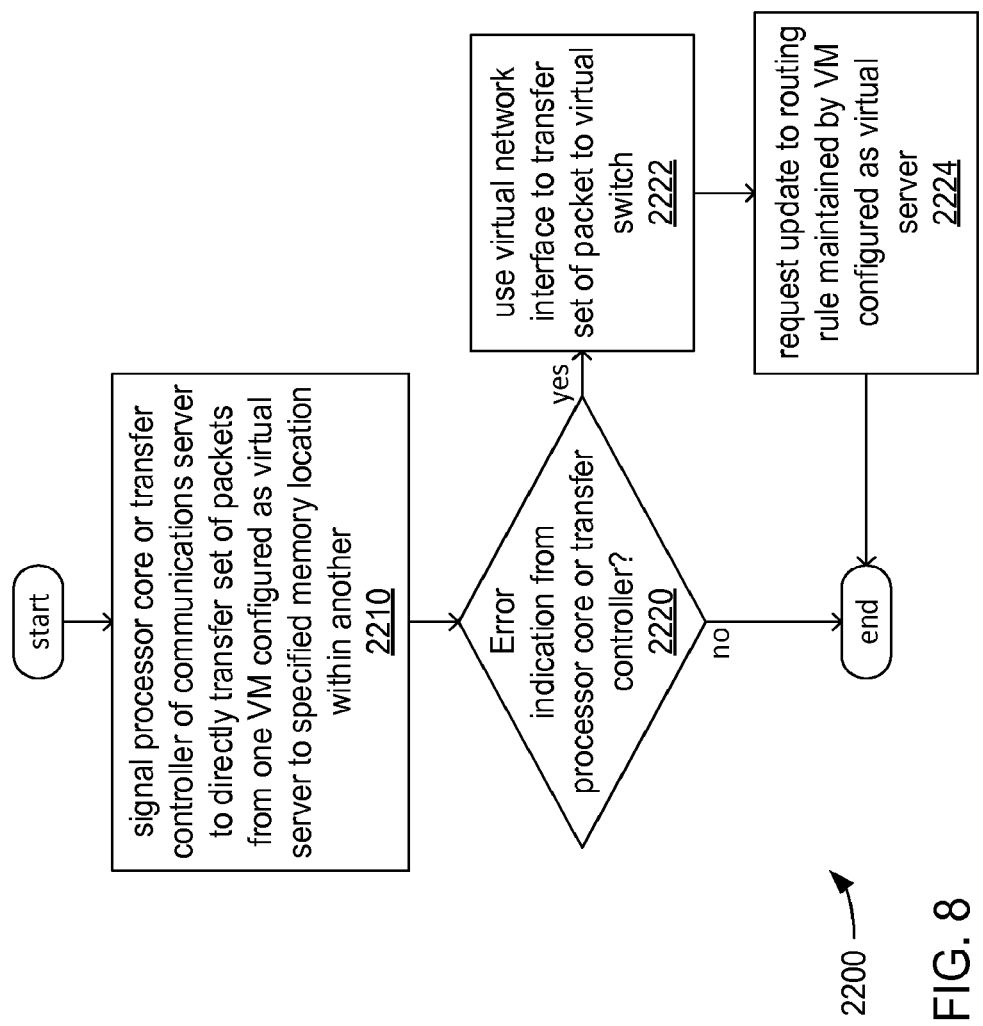

FIG. 8 illustrates an embodiment of a logic flow 2200. The logic flow 2200 may be representative of some or all of the operations executed by one or more embodiments described herein. More specifically, the logic flow 2200 may illustrate operations performed by one or more of the processor components 550 in executing at least the control routine 540 and/or the transfer component 749, and/or performed by other component(s) of the communications server 500. In particular, the logic flow 2200 is focused on operations to route packets in greater detail.

At 2210, at least one processor core of at least one processor component of a communications server (e.g., at least one processor core 555 of at least one of the processor components 550 of the communications server 500) executes instructions of a transfer component within a VM configured as a virtual server (e.g., one of the application routines 740 within one of the VMs 567 configured as one of the virtual servers 700) to signal either another processor core or a transfer controller of the communication server to transfer a set of packets directly to another VM configured as another virtual server. As has also been explained, such a direct transfer from one such VM to another may be deemed desirable to avoid additional latencies associated with transferring a set of packets to another such VM through a virtual switch generated within the communications server (e.g., the virtual switch 300).

At 2220, a check is made as to whether an indication of an error associated with the direct transfer has been received from the other processor core or the transfer controller. If such an indication of an error has been received, then the set of packets may be transferred to the virtual switch through a virtual network interface of the VM at 2222. Further, at 2224, the virtual switch or another component of the communications server may be signaled with a request to provide an update to the routing rule maintained by the VM and used by the at least one processor core to determine whether the set of packets is to be transmitted directly to the other VM or to the virtual switch. As previously discussed, such an error may arise due to a change among the VMs instantiated within the communications server, including and not limited to, a change in access permissions and/or addresses associated with where a set of packets may be transferred to as part of effecting such a direct transfer between VMs.

Figure 9:
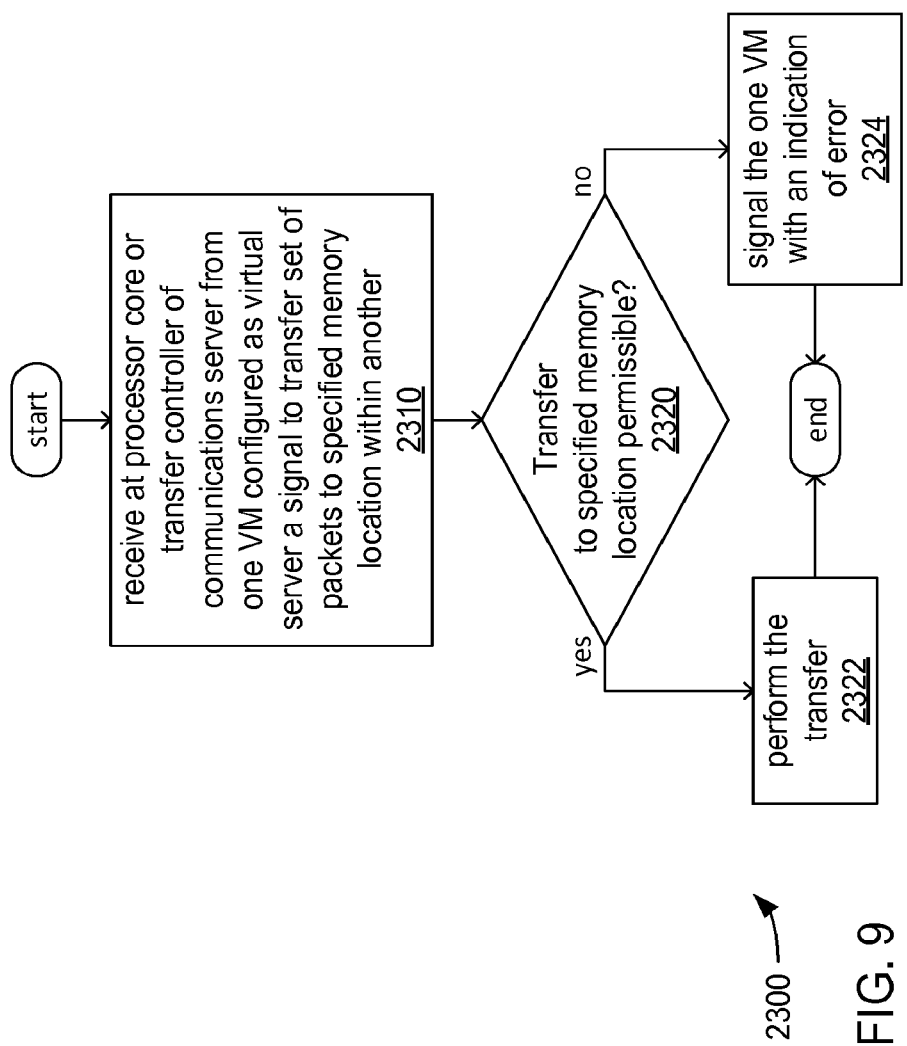

FIG. 9 illustrates an embodiment of a logic flow 2300. The logic flow 2300 may be representative of some or all of the operations executed by one or more embodiments described herein. More specifically, the logic flow 2300 may illustrate operations performed by one or more of the processor components 550 and/or 650 in executing at least the control routine 540 and/or the control routine 640, respectively, and/or performed by other component(s) of the communications server 500 and/or the transfer controller 600. In particular, the logic flow 2300 is focused on operations to route packets in greater detail.

At 2310, a processor core or a transfer controller of a communication server (e.g., one of the processor cores 555 of one of the processor components 550, or the transfer controller 600) receives, from one VM configured as a virtual server (e.g., one of the VMs 567 configured as one of the virtual servers 700) a signal to transfer a set of packets from that VM to a specified memory location within another such VM. As has been explained, a set of packets may be transferred between VMs by signaling a transfer controller or through use of an instruction to perform transfers between VMs that is supported by a processor core.

At 2320, the processor core or the transfer controller may perform a check as to whether the transfer of the set of packets to the specified memory location is permissible. As has been explained, the memory location within a VM to which a set of packets may be transferred may change over time as a result of various events, including and not limited to, a re-instantiation of such a VM. If the requested transfer is permissible, then the processor core or the transfer controller may perform the requested transfer at 2322. However, if the requested transfer is not permissible, then the processor core or the transfer controller may signal the VM from which the request was received with an indication of an error.

Figure 10:
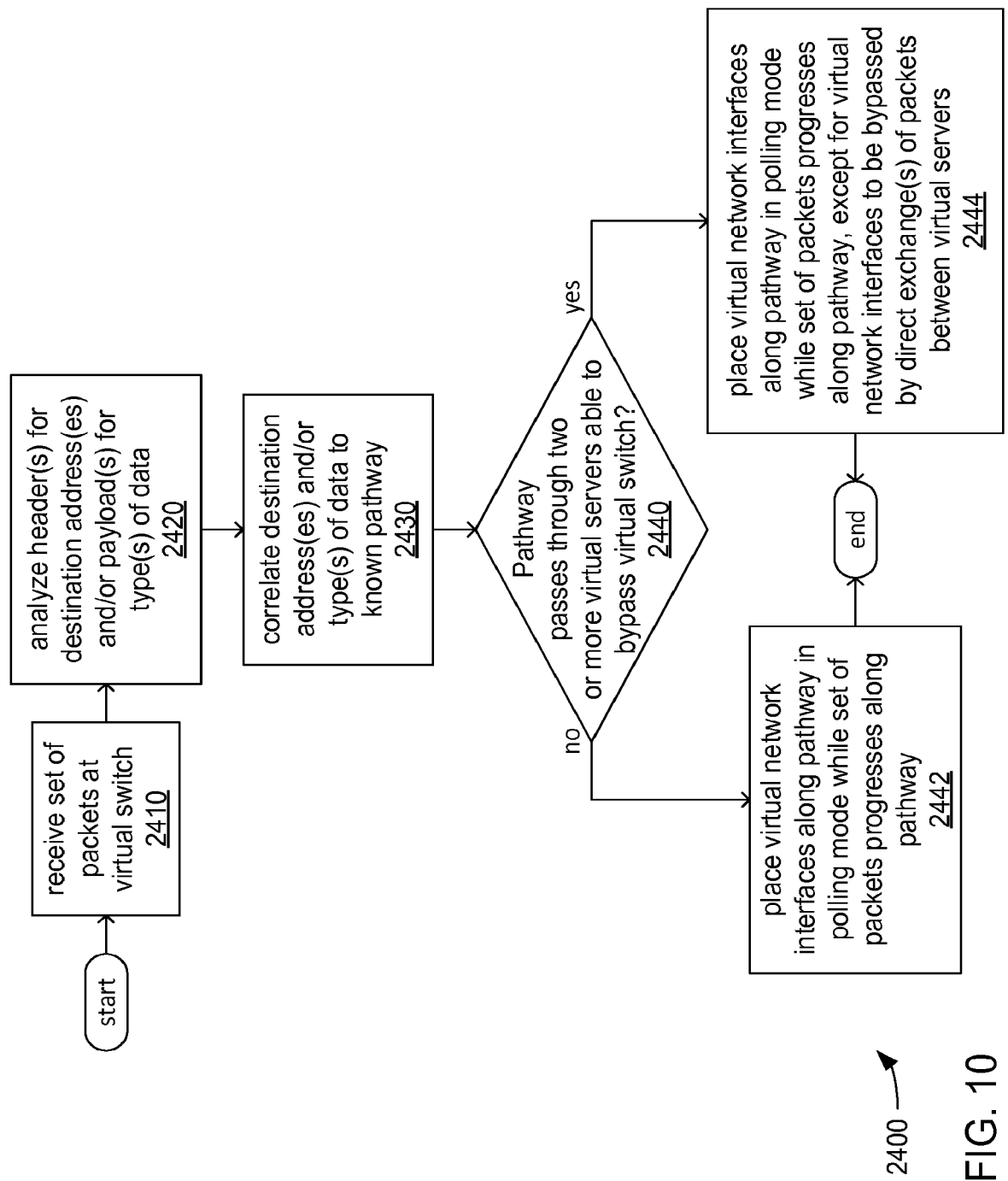

FIG. 10 illustrates an embodiment of a logic flow 2400. The logic flow 2400 may be representative of some or all of the operations executed by one or more embodiments described herein. More specifically, the logic flow 2400 may illustrate operations performed by one or more of the processor components 550 in executing at least the control routine 540, and/or performed by other component(s) of the communications server 500. In particular, the logic flow 2400 is focused on operations to route packets in greater detail.

At 2410, at least one processor core of at least one processor component of a communications server (e.g., at least one processor core 555 of at least one of the processor components 550 of the communications server 500) receives a set of packets through a network interface of the communications server (e.g., the network interface 590r) and at a virtual network interface of a virtual switch generated within the communications server by the at least one processor core (e.g., the virtual network interface 390r of the virtual switch 300). As previously discussed, one or more processor cores of a communications server may generate a virtual switch within the communications server to replace a physically distinct network switch in support of routing sets of packets among multiple VMs that are each configured as one of multiple virtual servers within the communications server to replace multiple physically distinct servers (e.g., the multiple VMs 567 that are each configured as one of the multiple virtual servers 700).

At 2420, a packet analyzer of the virtual switch may analyze the contents and/or payload of one or more packets of the received set of packets (e.g., the destination addresses, data types and/or data sizes thereof), and may compare one or more of those contents to indications of contents previously correlated with known pathways to identify a known pathway that correlates to the contents of the received set of packets, and by which the received set of packets may proceed through one or more of the virtual servers at 2430. At 2440, upon identifying such a known pathway, the packet analyzer may check whether the known pathway passes through two or more virtual servers that are able to cooperate to implement a portion of that pathway between them in a manner that bypasses the virtual switch. As has been discussed, there may be one or more pairs of the virtual servers that are able to cooperate through a portion of shared memory to directly exchange packets in a manner that is entirely independent of the virtual switch.

If, at 2440, there are no such pairs of the virtual servers along the identified pathway, then at 2442, the at least one processor core may place virtual network interfaces of the one or more virtual servers (e.g., the virtual network interfaces 793r and/or 793t) that are along that identified pathway in a polling mode, while avoiding placing the virtual network interfaces of others of the virtual servers that are not along that identified pathway into a polling mode. As has been discussed, placing the virtual network interfaces that are along the identified pathway in a polling mode while avoiding placing others of the virtual network interfaces that are not along the identified pathway in a polling mode minimizes latencies imposed on the received set of packets as they pass through the virtual network interfaces along the identified pathway, while also avoiding unnecessarily dedicating whole processor cores to supporting a polling mode at virtual network interfaces that are not along the identified pathway.

However, if at 2440, there are one or more of such pairs of the virtual servers along the identified pathway, then at 2444, the at least one processor core may place virtual network interfaces of the one or more virtual servers that are along that identified pathway in a polling mode, except for the virtual network interfaces of those virtual servers that will not be used as a result of such direct exchanges of the set of packets between the virtual servers in each of those pairs of virtual servers. Again, the at least one processor core may also avoid placing the virtual network interfaces of others of the virtual servers that are not along that identified pathway into a polling mode.

Figure 11:
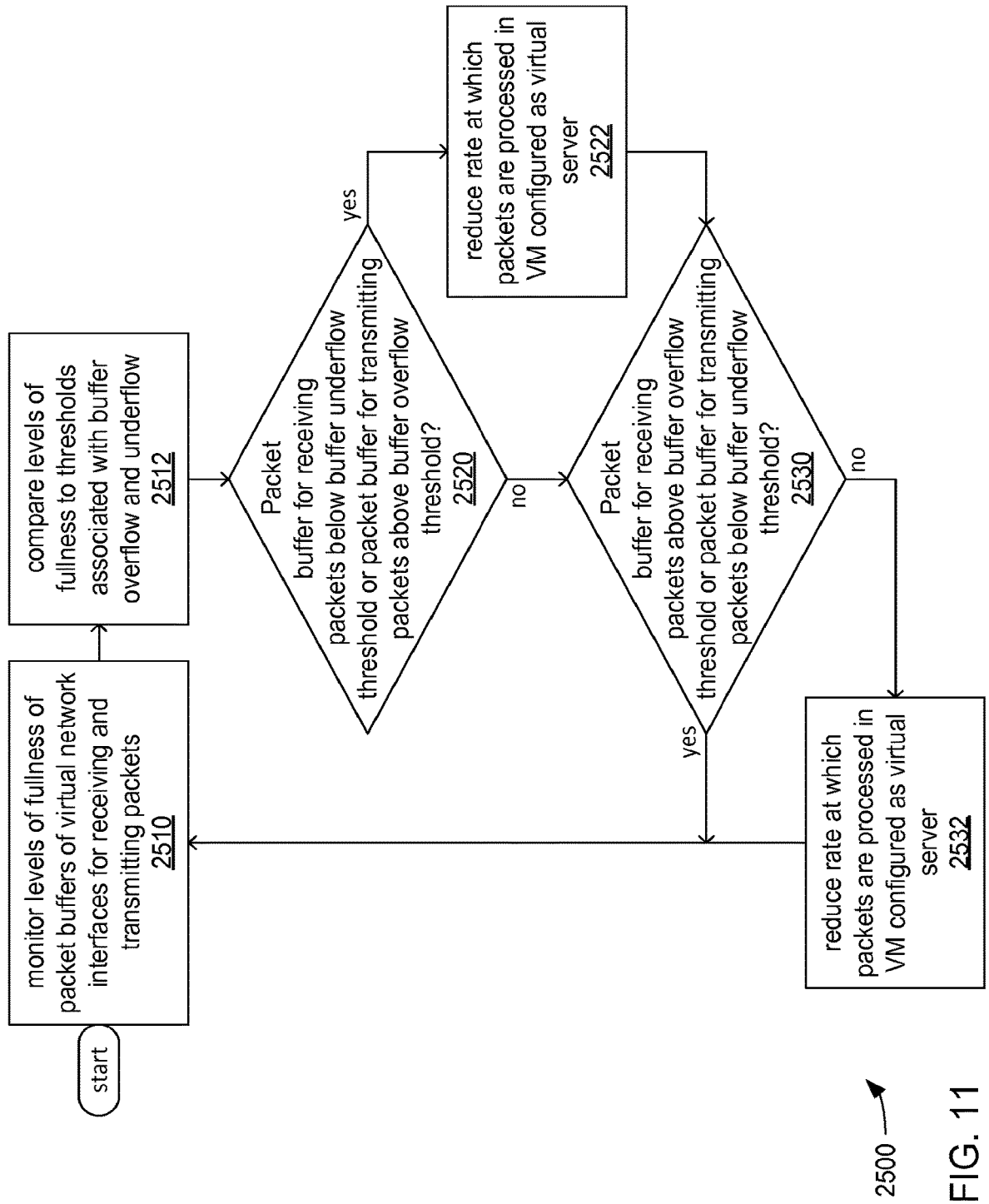

FIG. 11 illustrates an embodiment of a logic flow 2500. The logic flow 2500 may be representative of some or all of the operations executed by one or more embodiments described herein. More specifically, the logic flow 2500 may illustrate operations performed by one or more of the processor components 550 in executing at least the control routine 540, and/or performed by other component(s) of the communications server 500. In particular, the logic flow 2500 is focused on operations to route packets in greater detail.

At 2510, at least one processor core of at least one processor component of a communications server (e.g., at least one processor core 555 of at least one of the processor components 550 of the communications server 500) monitors levels of fullness of packet buffers of virtual network interfaces of a virtual server (e.g., the virtual network interfaces 793*r* and 793*t*, and corresponding packet buffers 769*r* and 769*t* of one of the virtual servers 700) that are used to receive and send packets. At 2512, the at least one processor core may compare those levels of fullness to one or more thresholds associated with buffer overflow and/or underflow conditions. As has been discussed, it may be either a portion of an application routine executed by the at least one processor core within the virtual server (e.g., the rate control component 745 of one of the application routines 740) or a portion of a control routine executed by the at least one processor core externally of the virtual server (e.g., the process control component 545 of the control routine 540) that monitors levels of fullness and performs such comparisons of levels of fullness to thresholds.

At 2520, a check may be made to determine if the level of fullness of the packet buffer for receiving packets has fallen below a threshold associated with buffer underflow and/or if the level of fullness of the packet buffer for transmitting packets has risen above a threshold associated with buffer overflow. If either condition is true, then the at least one processor core may act at 2522 to reduce the rate at which packets are processed by reducing the rate of execution of instructions of the application routine within the virtual server to cause a corresponding reduction in the rate at which the packet buffer for receiving packets is emptied and/or the rate at which the packet buffer for transmitting packets is filled.

Regardless of the result of the check made at 2520, at 2530, another check may be made to determine if the level of fullness of the packet buffer for receiving packets has risen above a threshold associated with buffer overflow and/or if the level of fullness of the packet buffer for transmitting packets has fallen below a threshold associated with buffer underflow. If either condition is true, then the at least one processor core may act at 2532 to increase the rate at which packets are processed by increasing the rate of execution of instructions of the application routine within the virtual server to cause a corresponding increase in the rate at which the packet buffer for receiving packets is emptied and/or the rate at which the packet buffer for transmitting packets is filled.

Figure 12:
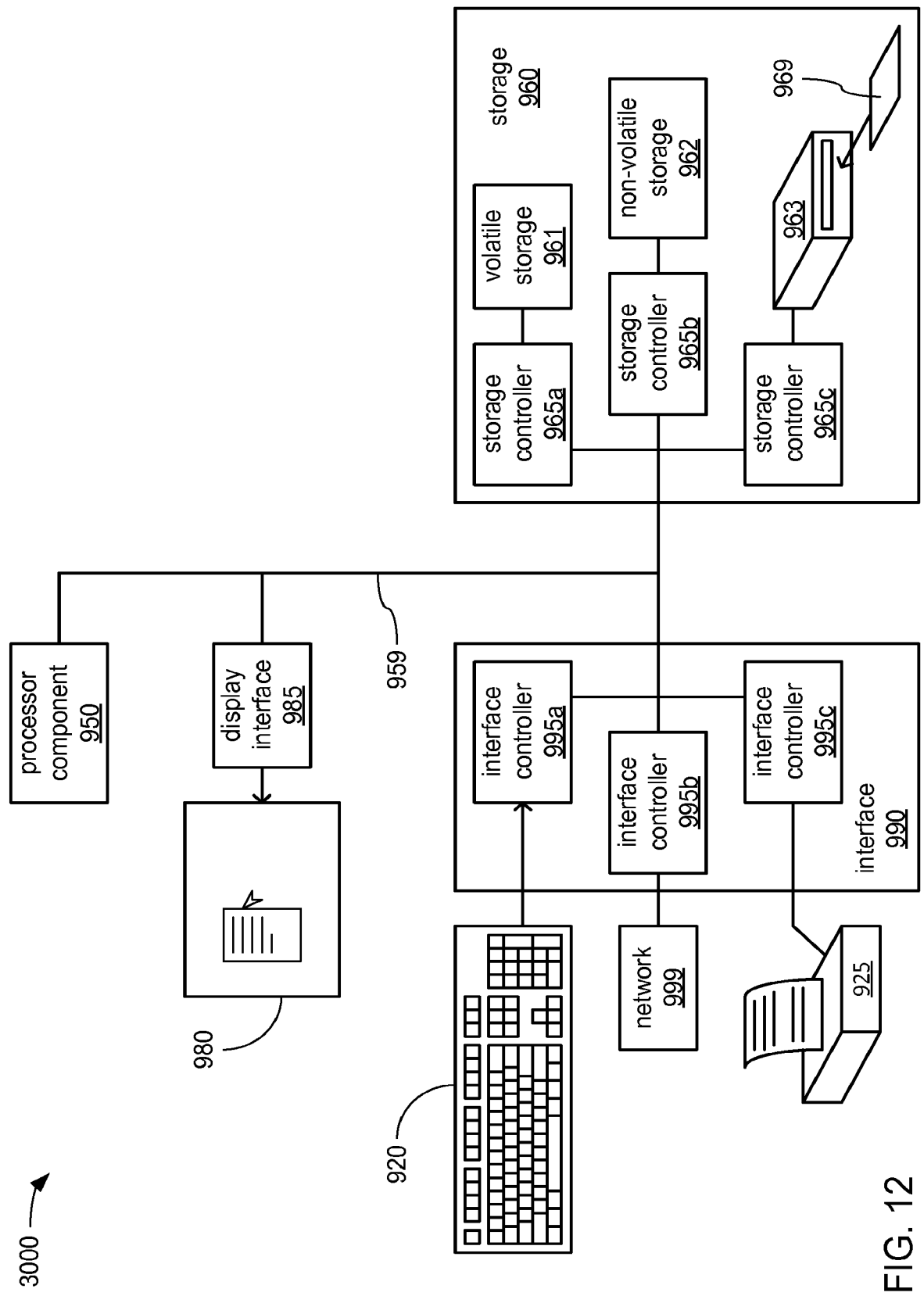
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 100, 400 or 800. It should be noted that components of the processing architecture 3000 are given reference numbers in which the last two digits correspond to the last two digits of reference numbers of at least some of the components earlier depicted and described as part of the computing devices 100, 400 and 800. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (which may correspond to the processor component 450) may include any of a wide variety of commercially available processors, employing any of a wide variety of technologies and implemented with one or more cores physically combined in any of a number of ways.

As previously discussed, the storage 960 (which may correspond to the storage 460) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interface(s) 490) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless signaling, timings and/or protocols to access other computing devices through the depicted network 999 (perhaps a network made up of one or more links, smaller networks, or perhaps the Internet). More specifically, the interface controller 995*b* may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995*c* may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus includes a processor component, a network interface to couple the processor component to a network, a virtual switch and a transfer component. The virtual switch is to analyze contents of at least one packet of a set of packets to be received at the network interface and/or to be exchanged between endpoint devices through the network and the communications server, and to route the set of packets through one or more virtual servers of multiple virtual servers based on the contents. The transfer component of a first virtual server of the multiple virtual servers is to determine whether to route the set of packets to the virtual switch or to transfer the set of packets to a second virtual server of the multiple virtual servers in a manner that bypasses the virtual switch based on a routing rule.

In Example 2, which includes the subject matter of Example 1, the apparatus may include a switch component to generate the virtual switch within a host session of a communications server.

In Example 3, which includes the subject matter of any of Examples 1-2, the set of packets may be received from a first endpoint device coupled to the network at the network interface, and the set of packets may be transmitted to a second endpoint device via the network after proceeding through the one or more virtual servers.

In Example 4, which includes the subject matter of any of Examples 1-3, the apparatus may include multiple application routines, each application routine of the multiple application routines may be executed within one of the virtual servers of the multiple virtual servers to perform a different type of processing on the set of packets, and the virtual switch may route the set of packets through the one or more virtual servers based at least on the type of processing performed by the application routine executed within each virtual server of the one or more virtual servers.

In Example 5, which includes the subject matter of any of Examples 1-4, the contents may include at least one of a destination address of a header of the at least one packet, a type of data conveyed in a payload of the at least one packet or a size of a portion of data conveyed in the payload, and the routing rule may indicate whether to route the set of packets to the other virtual server based on the contents.

In Example 6, which includes the subject matter of any of Examples 1-5, the virtual switch may route the set of packets based on the set of contents in accordance with one or more routing rules of multiple routing rules, and may provide the routing rule to the transfer component from among the multiple routing rules.

In Example 7, which includes the subject matter of any of Examples 1-6, the apparatus may include a storage coupled to the processor component, the storage may include a shared memory space accessible to the first and second virtual servers and occupying a portion of the storage not occupied by the first or second virtual servers, the transfer component may store the set of packets within the shared memory space to transfer the set of packets to the second virtual server based on the determination, and another transfer component of the second virtual server may retrieve the set of packets from the shared memory space.

In Example 8, which includes the subject matter of any of Examples 1-7, the apparatus may include a transfer controller, and the transfer component may signal the transfer controller to transfer the set of packets from the first virtual server to the second virtual server based on the determination.

In Example 9, which includes the subject matter of any of Examples 1-8, the apparatus may include a virtual machine (VM) component to generate multiple VMs within a communications server, to configure each VM of the multiple VMs as a virtual server of the multiple virtual servers, to generate at least one virtual network interface within each virtual server of the multiple virtual servers to couple each virtual server to the virtual switch, and to cause execution of an application routine of multiple application routines within each virtual server of the multiple virtual servers.

In Example 10, which includes the subject matter of any of Examples 1-9, the processor component may be capable of executing an instruction to transfer data from one VM to another VM, and the transfer component to use the instruction to cause the processor component to transfer the set of packets from the first virtual server to the second virtual server based on the determination.

In Example 11, which includes the subject matter of any of Examples 1-10, the apparatus may include a storage coupled to the processor component, the storage may include a shared memory space accessible to the first virtual server, the shared memory space may occupy a portion of the storage occupied by the second virtual server and not occupied by the first virtual server, and the transfer component may store the set of packets within the shared memory space to transfer the set of packets to the second virtual server based on the determination.

In Example 12, which includes the subject matter of any of Examples 1-11, memory space of the storage may be occupied by the first virtual server may include a first portion in which the transfer component is executed and a second portion in which an application routine is executed, and the transfer component may cause the processor component to designate only one of the first and second portions as executable.

In Example 13, which includes the subject matter of any of Examples 1-12, the apparatus may include a packet buffer defined within the shared memory space and associated with a virtual network interface of the second virtual server to buffer packets received by the second virtual server from either the first virtual server or the virtual switch.

In Example 14, which includes the subject matter of any of Examples 1-13, the virtual switch may correlate the contents to a pathway to extend from the virtual switch through the one or more virtual servers and back to the virtual switch, and the apparatus may include an interface control component to select one or more of the at least one virtual network interface of each of the one or more virtual servers along the pathway to operate in a polling mode, and to select one or more of the at least one virtual network interface of at least one virtual server of the multiple virtual servers not along the pathway to operate in a non-polling mode.

In Example 15, which includes the subject matter of any of Examples 1-14, the one or more virtual servers along the pathway may include the first and second virtual servers, and the interface control component may refrain from operating a first virtual network interface of the first virtual server and a second virtual network interface of the second virtual server in the polling mode in response to the ability of the transfer component to route the set of packets from the first virtual server to the second virtual server in a manner that bypasses the virtual switch.

In Example 16, which includes the subject matter of any of Examples 1-15, a virtual server of the one or more virtual servers may include a first virtual network interface to receive the set of packets from the virtual switch; a second virtual network interface to transmit the set of packets to the virtual switch; a first packet buffer associated with the first virtual network interface to store packets of the set of packets received from the virtual switch prior to processing by an application routine executed within the virtual server; and a second packet buffer associated with the second virtual network interface to store packets of the set of packets processed by the application routine and prior to transmission to the virtual switch.

In Example 17, which includes the subject matter of any of Examples 1-16, the apparatus may include a process control component to monitor a first level of fullness of the first packet buffer and a second level of fullness of the second packet buffer, to compare the first and second levels of fullness to at least a first threshold associated with buffer underflow and a second threshold associated with buffer overflow, to reduce a rate of processing of packets within the virtual server by the application routine in response to either the first level falling below the first threshold or the second level rising above the second threshold, and to increase the rate of processing of packets in response to either the first level rising above the second threshold or the second level falling below the first threshold.

In Example 18, a computing-implemented method includes receiving from a network, at a virtual switch generated within a communications server, a set of packets to be exchanged between endpoint devices through the network; analyzing, at the virtual switch, contents of at least one packet of the set of packets; routing, from the virtual switch, the set of packets through one or more virtual servers of multiple virtual servers based on the contents; and determining, at a first virtual server of the multiple virtual servers, whether to route the set of packets to the virtual switch or to transfer the set of packets to a second virtual server of the multiple virtual servers in a manner that bypasses the virtual switch based on a routing rule.

In Example 19, which includes the subject matter of Example 18, the method may include generating, with at least one processor core of at least one processor component of the communications server, the virtual switch within a host session of the communications server.

In Example 20, which includes the subject matter of any of Examples 18-19, the method may include receiving the set of packets from a first endpoint device coupled to the network and through a network interface of the communication server, and transmitting the set of packets to be transmitted to a second endpoint device via the network after proceeding through the one or more virtual servers.

In Example 21, which includes the subject matter of any of Examples 18-20, the method may include executing each application routine of multiple application routines within one of the virtual servers of the multiple virtual servers to perform a different type of processing on the set of packets; and routing, from the virtual switch, the set of packets through the one or more virtual servers based at least on the type of processing performed by the application routine executed within each virtual server of the one or more virtual servers In Example 22, which includes the subject matter of any of Examples 18-21, the contents may include at least one of a destination address of a header of the at least one packet, a type of data conveyed in a payload of the at least one packet or a size of a portion of data conveyed in the payload, and the routing rule indicating whether to route the set of packets to the other virtual server based on the contents.

In Example 23, which includes the subject matter of any of Examples 18-22, the method may include routing, from the virtual switch, the set of packets based on the set of contents in accordance with one or more routing rules of multiple routing rules; and providing the routing rule to the first virtual server from among the multiple routing rules.

In Example 24, which includes the subject matter of any of Examples 18-23, the method may include storing, by the first virtual server, the set of packets within a shared memory space to transfer the set of packets to the second virtual server based on the determination; and retrieving, by the second virtual server, the set of packets from the shared memory space, the shared memory space accessible to the first and second virtual servers and occupying a portion of storage of the communications server not occupied by the first or second virtual servers.

In Example 25, which includes the subject matter of any of Examples 18-24, the method may include signaling a transfer controller to transfer the set of packets from the first virtual server to the second virtual server based on the determination.

In Example 26, which includes the subject matter of any of Examples 18-25, the method may include generating multiple virtual machines (VMs) within the communications server, configuring each VM of the multiple VMs as a virtual server of the multiple virtual servers, generating the at least one virtual network interface within each virtual server of the multiple virtual servers to couple each virtual server to the virtual switch, and executing an application routine of multiple application routines within each virtual server of the multiple virtual servers.

In Example 27, which includes the subject matter of any of Examples 18-26, at least one processor core of the communications server may be capable of executing an instruction to transfer data from one VM to another VM, and the method may include using, by the first virtual server, the instruction to cause the processor core to transfer the set of packets from the first virtual server to the second virtual server based on the determination.

In Example 28, which includes the subject matter of any of Examples 18-27, the method may include storing, by the first virtual server, the set of packets within a shared memory space to transfer the set of packets to the second virtual server based on the determination, the shared memory space may be accessible to the first virtual server, and the shared memory space may occupy a portion of storage of the communications server occupied by the second virtual server and not occupied by the first virtual server.

In Example 29, which includes the subject matter of any of Examples 18-28, the method may include dividing memory space of the storage occupied by the first virtual server into a first portion in which a transfer component of the first virtual server is executed to transfer the set of packets to the second virtual server, and a second portion in which an application routine is executed; and causing a processor component of the communications server to designate only one of the first and second portions as executable.

In Example 30, which includes the subject matter of any of Examples 18-29, the method may include defining a packet buffer within the shared memory space, and associating the packet with a virtual network interface of the second virtual server to buffer packets received by the second virtual server from either the first virtual server or the virtual switch.

In Example 31, which includes the subject matter of any of Examples 18-30, the method may include correlating the contents to a pathway to extend from the virtual switch through the one or more virtual servers and back to the virtual switch; selecting one or more of the at least one virtual network interface of each of the one or more virtual servers along the pathway to operate in a polling mode; and selecting one or more of the at one virtual network interface of at least one virtual server of the multiple virtual servers not along the pathway to operate in a non-polling mode.

In Example 32, which includes the subject matter of any of Examples 18-31, the one or more virtual servers along the pathway may include the first and second virtual servers, and the method may include refraining from operating a first virtual network interface of the first virtual server and a second virtual network interface of the second virtual server in the polling mode in response to the ability of the transfer component to route the set of packets from the first virtual server to the second virtual server in a manner that bypasses the virtual switch.

In Example 33, which includes the subject matter of any of Examples 18-32, the method may include generating, within a virtual server of the one or more virtual servers, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

In Example 34, which includes the subject matter of any of Examples 18-33, the method may include monitoring a first level of fullness of the first packet buffer and a second level of fullness of the second packet buffer; comparing the first and second levels of fullness to at least a first threshold associated with buffer underflow and a second threshold associated with buffer overflow; reducing a rate of processing of packets within the virtual server by the application routine in response to either the first level falling below the first threshold or the second level rising above the second threshold; and increasing the rate of processing of packets in response to either the first level rising above the second threshold or the second level falling below the first threshold.

In Example 35, at least one tangible machine-readable storage medium includes instructions that when executed by a processor component, may cause the processor component to receive from a network, at a virtual switch generated within a communications server, a set of packets to be exchanged between endpoint devices through the network; analyze, at the virtual switch, contents of at least one packet of the set of packets; route, from the virtual switch, the set of packets through one or more virtual servers of multiple virtual servers based on the contents; and determine, at a first virtual server of the multiple virtual servers, whether to route the set of packets to the virtual switch or to transfer the set of packets to a second virtual server of the multiple virtual servers in a manner that bypasses the virtual switch based on a routing rule.

In Example 36, which includes the subject matter of Example 35, the processor component may be caused to generate, with at least one processor core of at least one processor component of the communications server, the virtual switch within a host session of the communications server.

In Example 37, which includes the subject matter of any of Examples 35-36, the processor component may be caused to receive the set of packets from a first endpoint device coupled to the network and through a network interface of the communication server; and transmit the set of packets to be transmitted to a second endpoint device via the network after proceeding through the one or more virtual servers.

In Example 38, which includes the subject matter of any of Examples 35-37, the processor component may be caused to execute each application routine of multiple application routines within one of the virtual servers of the multiple virtual servers to perform a different type of processing on the set of packets; and route, from the virtual switch, the set of packets through the one or more virtual servers based at least on the type of processing performed by the application routine executed within each virtual server of the one or more virtual servers In Example 39, which includes the subject matter of any of Examples 35-38, the contents may include at least one of a destination address of a header of the at least one packet, a type of data conveyed in a payload of the at least one packet or a size of a portion of data conveyed in the payload, and the routing rule to indicate whether to route the set of packets to the other virtual server based on the contents.

In Example 40, which includes the subject matter of any of Examples 35-39, the processor component may be caused to route, from the virtual switch, the set of packets based on the set of contents in accordance with one or more routing rules of multiple routing rules; and provide the routing rule to the first virtual server from among the multiple routing rules.

In Example 41, which includes the subject matter of any of Examples 35-40, the processor component may be caused to store, by the first virtual server, the set of packets within the shared memory space to transfer the set of packets to the second virtual server based on the determination; and retrieve, by the second virtual server, the set of packets from the shared memory space, the shared memory space accessible to the first and second virtual servers and occupying a portion of storage of the communications server not occupied by the first or second virtual servers.

In Example 42, which includes the subject matter of any of Examples 35-41, the processor component may be caused to signal a transfer controller coupled to the processor component to transfer the set of packets from the first virtual server to the second virtual server based on the determination.

In Example 43, which includes the subject matter of any of Examples 35-42, the processor component may be caused to generate multiple virtual machines (VMs) within the communications server; configure each VM of the multiple VMs as a virtual server of the multiple virtual servers; generate the at least one virtual network interface within each virtual server of the multiple virtual servers to couple each virtual server to the virtual switch; and execute an application routine of multiple application routines within each virtual server of the multiple virtual servers.

In Example 44, which includes the subject matter of any of Examples 35-43, at least one processor core of the communications server may be capable of executing an instruction to transfer data from one VM to another VM, and the processor component may be caused to use the instruction to cause the processor core to transfer the set of packets from the first virtual server to the second virtual server based on the determination.

In Example 45, which includes the subject matter of any of Examples 35-44, the processor component may be caused to store, from the first virtual server, the set of packets within a shared memory space to transfer the set of packets to the second virtual server based on the determination, the shared memory space accessible to the first virtual server, the shared memory space occupying a portion of storage of the communications server occupied by the second virtual server and not occupied by the first virtual server.

In Example 46, which includes the subject matter of any of Examples 35-45, the processor component may be caused to divide memory space of the storage occupied by the first virtual server into a first portion in which a transfer component of the first virtual server is executed to transfer the set of packets to the second virtual server, and a second portion in which an application routine is executed; and designate only one of the first and second portions as executable.

In Example 47, which includes the subject matter of any of Examples 35-46, the processor component may be caused to define a packet buffer within the shared memory space; and associate the packet with a virtual network interface of the second virtual server to buffer packets received by the second virtual server from either the first virtual server or the virtual switch.

In Example 48, which includes the subject matter of any of Examples 35-47, the processor component may be caused to correlate the contents to a pathway to extend from the virtual switch through the one or more virtual servers and back to the virtual switch; select one or more of the at least one virtual network interface of each of the one or more virtual servers along the pathway to operate in a polling mode; and select one or more of the at one virtual network interface of at least one virtual server of the multiple virtual servers not along the pathway to operate in a non-polling mode.

In Example 49, which includes the subject matter of any of Examples 35-48, the one or more virtual servers along the pathway may include the first and second virtual servers, and the processor component may be caused to refrain from operating a first virtual network interface of the first virtual server and a second virtual network interface of the second virtual server in the polling mode in response to the ability of the transfer component to route the set of packets from the first virtual server to the second virtual server in a manner that bypasses the virtual switch.

In Example 50, which includes the subject matter of any of Examples 35-49, the processor component may be caused to generate, within a virtual server of the one or more virtual servers, a first virtual network interface to receive the set of packets from the virtual switch, a second virtual network interface to transmit the set of packets to the virtual switch, a first packet buffer associated with the first virtual network interface to store packets of the set of packets received from the virtual switch prior to processing by an application routine executed within the virtual server, and a second packet buffer associated with the second virtual network interface to store packets of the set of packets processed by the application routine and prior to transmission to the virtual switch.

In Example 51, which includes the subject matter of any of Examples 35-50, the processor component may be caused to monitor a first level of fullness of the first packet buffer and a second level of fullness of the second packet buffer; compare the first and second levels of fullness to at least a first threshold associated with buffer underflow and a second threshold associated with buffer overflow; reduce a rate of processing of packets within the virtual server by the application routine in response to either the first level falling below the first threshold or the second level rising above the second threshold; and increase the rate of processing of packets in response to either the first level rising above the second threshold or the second level falling below the first threshold.

In Example 52, an apparatus includes a processor component of a communications server, a network interface to couple the processor component to a network, a virtual machine (VM) component, and a transfer component. The VM component may generate multiple VMs within the communications server, may configure each VM of the multiple VMs as a virtual server of multiple virtual servers, and may generate at least one virtual network interface within each virtual server of the multiple virtual servers to couple each virtual server to a virtual switch. The transfer component of a first virtual server of the multiple virtual servers may determine whether to route a set of packets to the virtual switch or to transfer the set of packets to a second virtual server of the multiple virtual servers in a manner that bypasses the virtual switch based on a routing rule, and the set of packets may be exchanged between endpoint devices through the network and the communications server.

In Example 53, which includes the subject matter of Example 52, the apparatus may include a switch component to generate the virtual switch within a host session of the communications server, and the virtual switch may analyze contents of at least one packet of the set of packets, and to route the set of packets through one or more of the virtual servers of multiple virtual servers based on the contents.

In Example 54, which includes the subject matter of any of Examples 52-53, the contents may include at least one of a destination address of a header of the at least one packet, a type of data conveyed in a payload of the at least one packet or a size of a portion of data conveyed in the payload, and the routing rule to indicate whether to route the set of packets to the other virtual server based on the contents.

In Example 55, which includes the subject matter of any of Examples 52-54, the virtual switch may route the set of packets based on the set of contents in accordance with one or more routing rules of multiple routing rules, and to provide the routing rule to the transfer component from among the multiple routing rules.

In Example 56, which includes the subject matter of any of Examples 52-55, the apparatus may include multiple application routines, each application routine of the multiple application routines to be executed within one of the virtual servers of the multiple virtual servers to perform a different type of processing on the set of packets, and the virtual switch to route the set of packets through the one or more virtual servers based at least on the type of processing performed by the application routine executed within each virtual server of the one or more virtual servers.

In Example 57, which includes the subject matter of any of Examples 52-56, the set of packets to be received from a first endpoint device coupled to the network at the network interface, and the set of packets to be transmitted to a second endpoint device via the network after proceeding through the one or more virtual servers.

In Example 58, which includes the subject matter of any of Examples 52-57, the apparatus may include a storage coupled to the processor component, the storage may include a shared memory space accessible to the first and second virtual servers and occupying a portion of the storage not occupied by the first or second virtual servers, the transfer component may store the set of packets within the shared memory space to transfer the set of packets to the second virtual server based on the determination, and another transfer component of the second virtual server may retrieve the set of packets from the shared memory space.

In Example 59, which includes the subject matter of any of Examples 52-58, the apparatus may include a transfer controller, the transfer component to signal the transfer controller to transfer the set of packets from the first virtual server to the second virtual server based on the determination.

In Example 60, which includes the subject matter of any of Examples 52-59, the processor component may be capable of executing an instruction to transfer data from one VM to another VM, and the transfer component may use the instruction to cause the processor component to transfer the set of packets from the first virtual server to the second virtual server based on the determination.

In Example 61, which includes the subject matter of any of Examples 52-60, the apparatus may include a storage coupled to the processor component, the storage may include a shared memory space accessible to the first virtual server, the shared memory space occupying a portion of the storage occupied by the second virtual server and not occupied by the first virtual server, and the transfer component may store the set of packets within the shared memory space to transfer the set of packets to the second virtual server based on the determination.

In Example 62, which includes the subject matter of any of Examples 52-61, memory space of the storage occupied by the first virtual server may include a first portion in which the transfer component is executed and a second portion in which an application routine is executed, and the transfer component may cause the processor component to designate only one of the first and second portions as executable.

In Example 63, which includes the subject matter of any of Examples 52-62, the apparatus may include a packet buffer defined within the shared memory space and associated with a virtual network interface of the second virtual server to buffer packets received by the second virtual server from either the first virtual server or the virtual switch.

In Example 64, at least one tangible machine-readable storage medium may include instructions that when executed by a processor component, cause the processor component to perform any of the above.

In Example 65, an apparatus may include means for performing any of the above.

The invention claimed is:

1. An apparatus to control communications comprising:
at least one processor;
a network interface to couple the at least one processor to a network; and
a memory storing instructions which when executed by the at least one processor cause the at least one processor to:
route, by a virtual switch, a set of packets to a first virtual server of a plurality of virtual servers based on an analysis of a destination address of at least one packet of the set of packets, the virtual switch and the plurality of virtual servers to be executed by the at least one processor; and
determine, by the first virtual server based on a routing rule and an analysis of the destination address of the at least one packet, whether to route the set of packets to the virtual switch or to transfer the set of packets to a second virtual server of the plurality of virtual servers in a manner that bypasses the virtual switch.

2. The apparatus of claim 1, the first virtual server to transfer the set of packets from a memory space in the memory allocated to the first virtual server to a memory space in the memory allocated to the second virtual server.

3. The apparatus of claim 2, the memory space in the memory allocated to the second virtual server to comprise a packet buffer allocated to a virtual network interface of the second virtual server, the packet buffer to buffer packets received by the second virtual server from either the first virtual server or the virtual switch.

4. The apparatus of claim 1, the plurality of virtual servers to execute a plurality of application routines, the virtual switch to route the set of packets through the plurality of virtual servers based at least on a type of processing performed by the plurality of application routines.

5. The apparatus of claim 1, comprising a storage coupled to the at least one processor, the storage comprising a shared memory space accessible to the first virtual server and second virtual server, the first virtual server to transfer the set of packets to the second virtual server by storing the set of packets in the shared memory space.

6. The apparatus of claim 1, the set of packets to be transferred to the second virtual server in the manner that bypasses a plurality of virtual network interfaces of the first virtual server, the set of packets to be stored in a shared memory space shared by the first and second virtual servers.

7. The apparatus of claim 6, the memory storing instructions which when executed by the at least one processor cause the at least one processor to:
transfer data between the first virtual server and the second virtual server; and
transfer the set of packets from the first virtual server to the second virtual server based on a determination to transfer the set of packets to the second virtual server in the manner that bypasses the virtual switch.

8. The apparatus of claim 1, the set of packets received from a first endpoint device coupled to the network at the network interface, and the set of packets transmitted to a second endpoint device via the network after proceeding through the second virtual server.

9. The apparatus of claim 1, the routing rule to indicate whether to route the set of packets to one of the plurality of virtual servers based on contents of the set of packets, a first packet buffer associated with a first virtual network interface of the first virtual server to store the set of packets received from the virtual switch, the memory storing instructions which when executed by the at least one processor cause the at least one processor to:
monitor a level of fullness of the first packet buffer;
determine the level of fullness is below a threshold; and
reduce a rate of processing of packets within the first virtual server in response to determining the level of fullness is below the threshold.

10. A computer-implemented method for controlling communications comprising:
routing, via a virtual switch executing on a processor, a set of packets to a first virtual server of a plurality of virtual servers based on an analysis of a destination address of at least one packet of the set of packets, the virtual switch and the plurality of virtual servers executing on the processor; and
determining, by the first virtual server based on a routing rule and an analysis of the destination address of the at least one packet, whether to route the set of packets to the virtual switch or to transfer the set of packets to a second virtual server of the plurality of virtual servers in a manner that bypasses the virtual switch.

11. The computer-implemented method of claim 10, further comprising:
transferring, via the first virtual server, the at least a portion of the set of packets from a memory space in the memory allocated to the first virtual server to a memory space in the memory allocated to the second virtual server.

12. The computer-implemented method of claim 11, the memory space in the memory allocated to the second virtual server to comprise a packet buffer allocated to a virtual network interface of the second virtual server, the packet buffer to buffer packets received by the second virtual server from either the first virtual server or the virtual switch.

13. The computer-implemented method of claim 10, further comprising:
executing, via the plurality of virtual servers, a plurality of application routines, the virtual switch to route the set of packets through the plurality of virtual servers based at least on a type of processing performed by the plurality of application routines.

14. The computer-implemented method of claim 10, comprising:
providing a shared memory space accessible to the first virtual server and second virtual server via a storage, the first virtual server to transfer the set of packets to the second virtual server by storing the set of packets in the shared memory space.

15. The computer-implemented method of claim 10, the set of packets to be transferred to the second virtual server in the manner that bypasses a plurality of virtual network interfaces of the first virtual server, the set of packets to be stored in a shared memory space shared by the first and second virtual servers.

16. The computer-implemented method of claim 15, comprising:
executing, via the processor, an instruction to transfer data between the first virtual server and the second virtual server, the processor to transfer the set of packets from the first virtual server to the second virtual server based on a determination to transfer the set of packets to the second virtual server in the manner that bypasses the virtual switch.

17. The computer-implemented method of claim 10, comprising:
    receiving the set of packets from a first endpoint device coupled to a network at a network interface; and
    transmitting the set of packets to a second endpoint device via the network after proceeding through the second virtual server.

18. The computer-implemented method of claim 10, the routing rule to indicate whether to route the set of packets to one of the plurality of virtual servers based on contents of the set of packets, a first packet buffer associated with a first virtual network interface of the first virtual server to store the set of packets received from the virtual switch, the computer-implemented method further comprising:
    monitoring a level of fullness of the first packet buffer;
    determining the level of fullness is below a threshold; and
    reduce a rate of processing of packets within the first virtual server in response to determining the level of fullness is below the threshold.

19. At least one machine-readable non-transitory storage medium comprising instructions that when executed by a processor, cause the processor to:
    route, via a virtual switch executed by the processor, a set of packets to a first virtual server of a plurality of virtual servers based on an analysis of a destination address of at least one packet of the set of packets, the virtual switch and the plurality of virtual servers to be executed by the processor; and
    determine, la the first virtual server based on a routing rule and an analysis of the destination address of the at least one packet, whether to route the set of packets to the virtual switch or to transfer the set of packets to a second virtual server of the plurality of virtual servers in a manner that bypasses the virtual switch.

20. The at least one machine-readable non-transitory storage medium of claim 19, the instructions, when executed by the processor, to cause the processor to transfer, la the first virtual server, the set of packets from a memory space in the memory allocated to the first virtual server to a memory space in the memory allocated to the second virtual server.

21. The at least one machine-readable non-transitory storage medium of claim 20, the memory space in the memory allocated to the second virtual server to comprise a packet buffer allocated to a virtual network interface of the second virtual server, the packet buffer to buffer packets received by the second virtual server from either the first virtual server or the virtual switch.

22. The at least one machine-readable non-transitory storage medium of claim 19, the instructions, when executed by the processor, to cause the processor to execute, via the plurality of virtual servers, a plurality of application routines, the virtual switch to route the set of packets through the plurality of virtual servers based at least on a type of processing performed by the plurality of application routines.

23. The at least one machine-readable non-transitory storage medium of claim 19, the instructions, when executed by the processor, to cause the processor to provide a shared memory space accessible to the first virtual server and second virtual server via a storage, the first virtual server to transfer the set of packets to the second virtual server by storing the set of packets in the shared memory space.

24. The at least one machine-readable non-transitory storage medium of claim 19, the set of packets to be transferred to the second virtual server in the manner that bypasses a plurality of virtual network interfaces of the first virtual server, the set of packets to be stored in a shared memory space shared by the first and second virtual servers.

25. The at least one machine-readable non-transitory storage medium of claim 19, the instructions, when executed by the processor, to cause the processor to receive the set of packets from a first endpoint device coupled to a network at a network interface, and to transmit the set of packets to a second endpoint device via the network after proceeding through the second virtual server.

26. The at least one machine-readable non-transitory storage medium of claim 19, the routing rule to indicate whether to route the set of packets to one of the plurality of virtual servers based on contents of the set of packets, a first packet buffer associated with a first virtual network interface of the first virtual server to store the set of packets received from the virtual switch, the instructions, when executed by the processor, to cause the processor to:
    monitor a level of fullness of the first packet buffer;
    determine the level of fullness is below a threshold; and
    reduce a rate of processing of packets within the first virtual server in response to determining the level of fullness is below the threshold.

* * * * *